(12) United States Patent
Lee et al.

(10) Patent No.: US 10,531,474 B2
(45) Date of Patent: Jan. 7, 2020

(54) METHOD FOR TRANSMITTING UPLINK DATA IN WIRELESS COMMUNICATION SYSTEM AND DEVICE FOR SAME

(71) Applicant: LG ELECTRONICS INC., Seoul (KR)

(72) Inventors: Eunjong Lee, Seoul (KR); Heejeong Cho, Seoul (KR); Genebeck Hahn, Seoul (KR); Jiwon Kang, Seoul (KR); Ilmu Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/571,598

(22) PCT Filed: May 4, 2015

(86) PCT No.: PCT/KR2015/004466

§ 371 (c)(1),
(2) Date: Nov. 3, 2017

(87) PCT Pub. No.: WO2016/178439

PCT Pub. Date: Nov. 10, 2016

(65) Prior Publication Data

US 2018/0092105 A1    Mar. 29, 2018

(51) Int. Cl.
*H04W 72/04*    (2009.01)
*H04W 72/10*    (2009.01)
(Continued)

(52) U.S. Cl.
CPC .......... *H04W 72/10* (2013.01); *H04L 1/1854* (2013.01); *H04L 1/1861* (2013.01);
(Continued)

(58) Field of Classification Search
CPC ............. H04W 72/10; H04W 72/1242; H04W 72/0446; H04W 76/50; H04W 74/0841; H04W 72/0413; H04L 1/1854
See application file for complete search history.

(56) References Cited

U.S. PATENT DOCUMENTS

2009/0268685 A1* 10/2009 Chen .................... H04L 1/1854
370/329
2011/0296064 A1   12/2011 Ehsan et al.
(Continued)

FOREIGN PATENT DOCUMENTS

KR   10-2013-0088121 A    8/2013
WO   WO 2014/182106 A1    11/2014

*Primary Examiner* — Hassan Kizou
*Assistant Examiner* — Mahbubul Bar Chowdhury
(74) *Attorney, Agent, or Firm* — Birch, Stewart, Kolasch & Birch, LLP

(57) ABSTRACT

The present specification relates to a method for transmitting uplink data (UL data) in a wireless communication system for supporting a low latency service, and the method executed by a first terminal is characterized by including the steps of: transmitting, to a base station, an urgent signal (US) for informing occurrence of an event related to an urgent situation; receiving, from the base station, a response to the urgent signal through two physical HARQ indication channel (PHICH) resources; and transmitting, to the base station, urgent data including detailed information related to the event that has occurred based on the received response. Each of the PHICH resources is determined by a physical resource block (PRB) index of a resource through which the urgent signal is transmitted.

13 Claims, 28 Drawing Sheets

(51) Int. Cl.
- *H04L 1/18* (2006.01)
- *H04L 5/00* (2006.01)
- *H04W 74/08* (2009.01)
- *H04W 72/12* (2009.01)
- *H04W 76/50* (2018.01)
- *H04L 1/00* (2006.01)
- *H04W 72/14* (2009.01)

(52) U.S. Cl.
CPC .......... *H04L 1/1864* (2013.01); *H04L 5/0055* (2013.01); *H04L 5/0091* (2013.01); *H04W 72/0413* (2013.01); *H04W 72/0446* (2013.01); *H04W 72/1242* (2013.01); *H04W 74/0841* (2013.01); *H04W 76/50* (2018.02); *H04L 1/0003* (2013.01); *H04L 1/0009* (2013.01); *H04L 5/0012* (2013.01); *H04L 5/0023* (2013.01); *H04L 5/0051* (2013.01); *H04W 72/14* (2013.01)

(56) References Cited

U.S. PATENT DOCUMENTS

| | | | |
|---|---|---|---|
| 2012/0275409 A1* | 11/2012 | Han | H04L 1/0007 370/329 |
| 2013/0016604 A1* | 1/2013 | Ko | H04B 7/0404 370/216 |
| 2013/0114570 A1* | 5/2013 | Park | H04L 5/0053 370/335 |
| 2013/0208587 A1* | 8/2013 | Bala | H04W 16/14 370/230 |
| 2014/0024331 A1 | 1/2014 | Hsu et al. | |
| 2014/0134970 A1 | 5/2014 | Pazos et al. | |
| 2015/0085811 A1* | 3/2015 | Ohta | H04L 1/12 370/329 |
| 2015/0304996 A1* | 10/2015 | Yang | H04L 5/0053 370/329 |

* cited by examiner

[Figure 1]
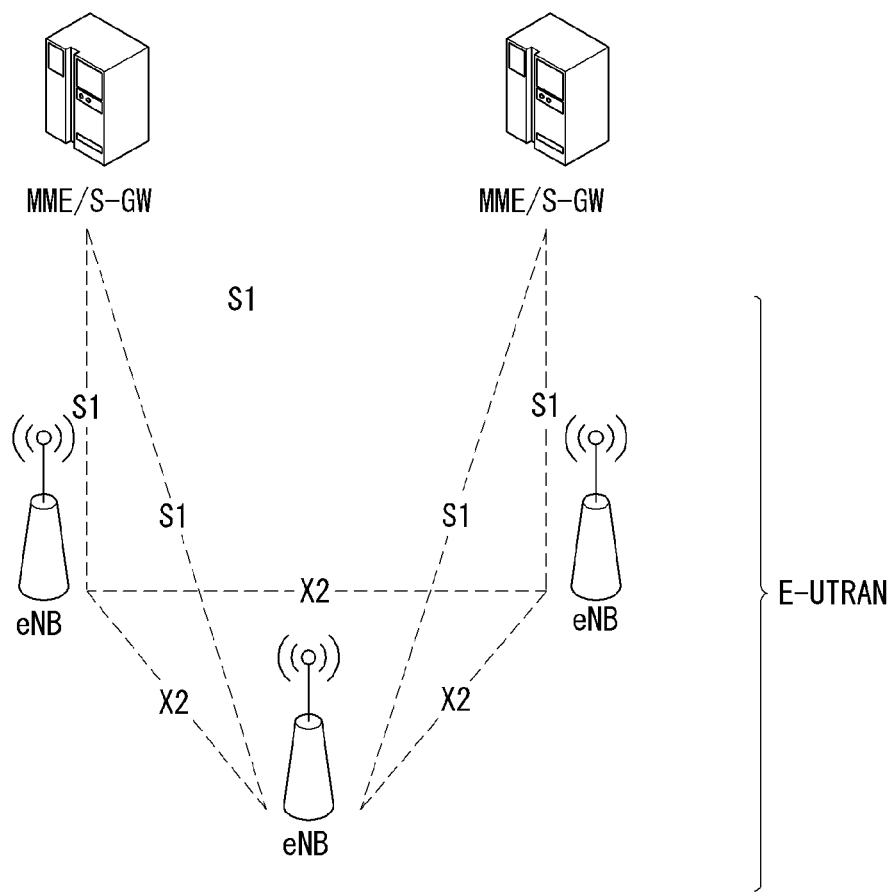

[Figure 2]
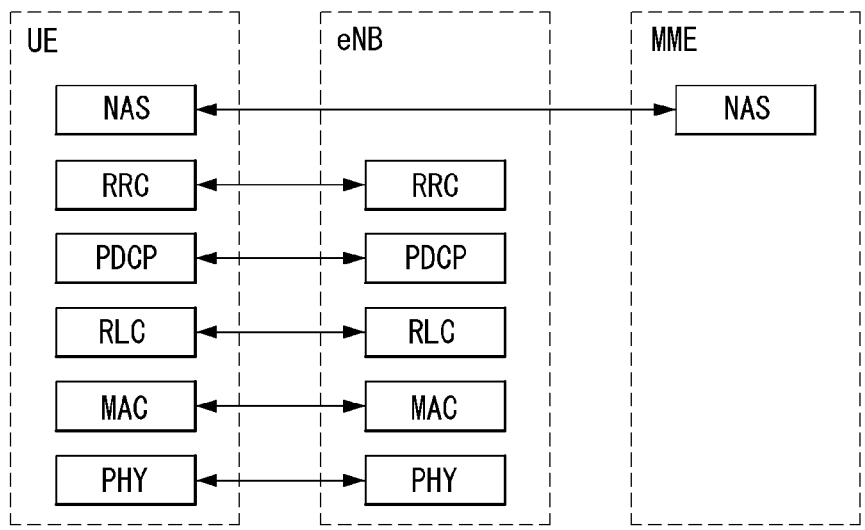
(a) Control plane protocol stack
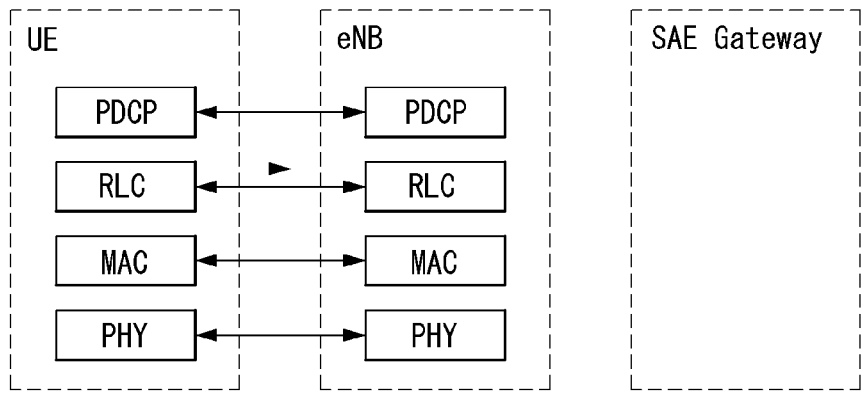
(b) User plane protocol stack

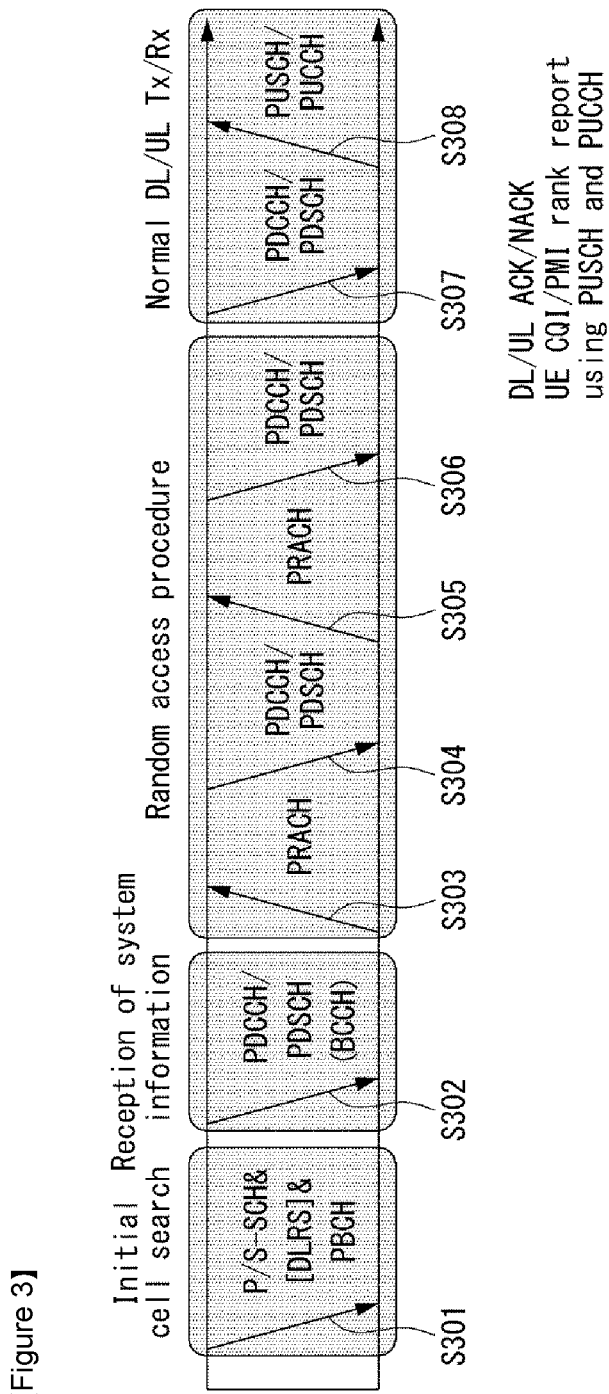
[Figure 3]

[Figure 4]
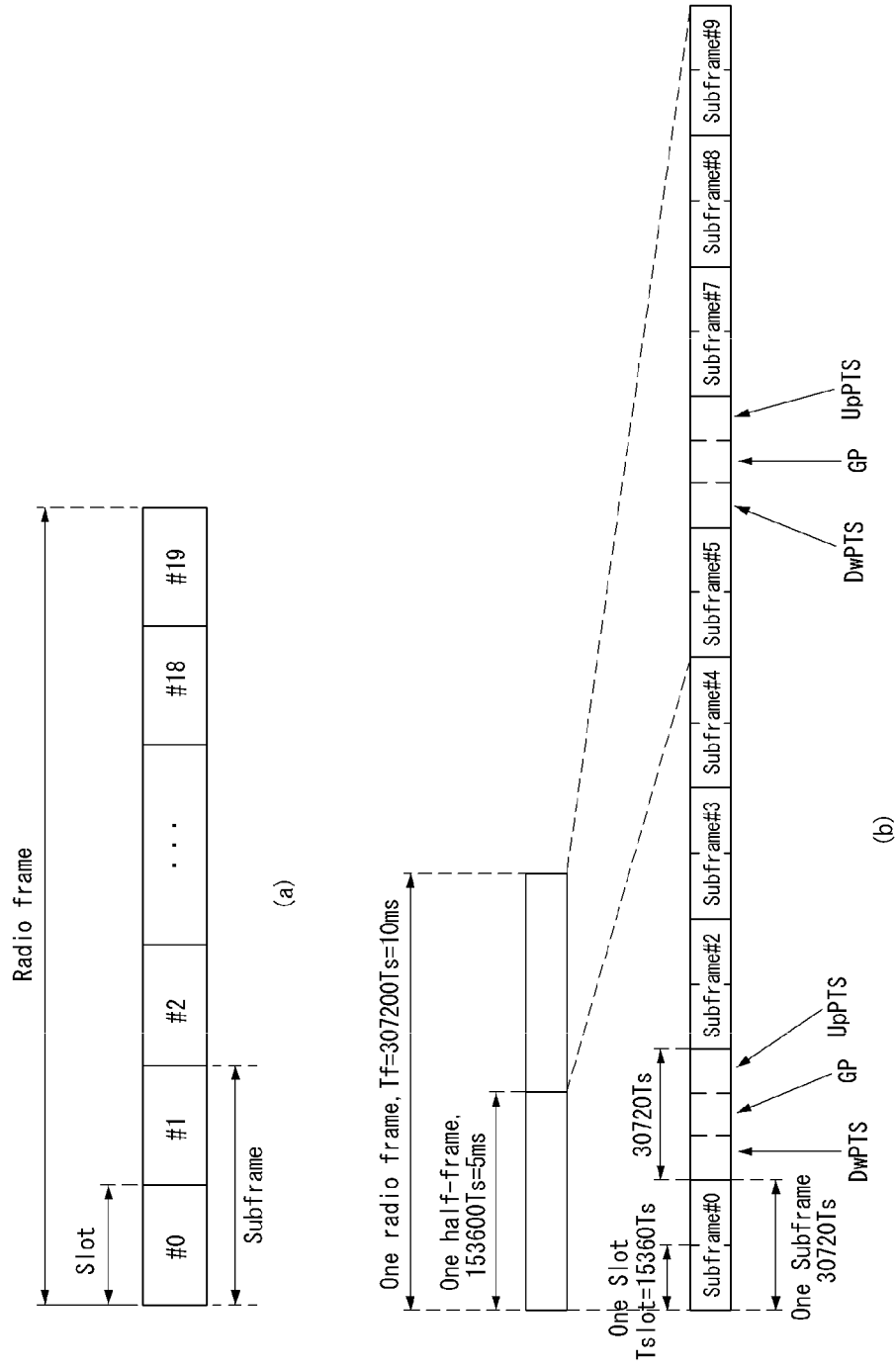

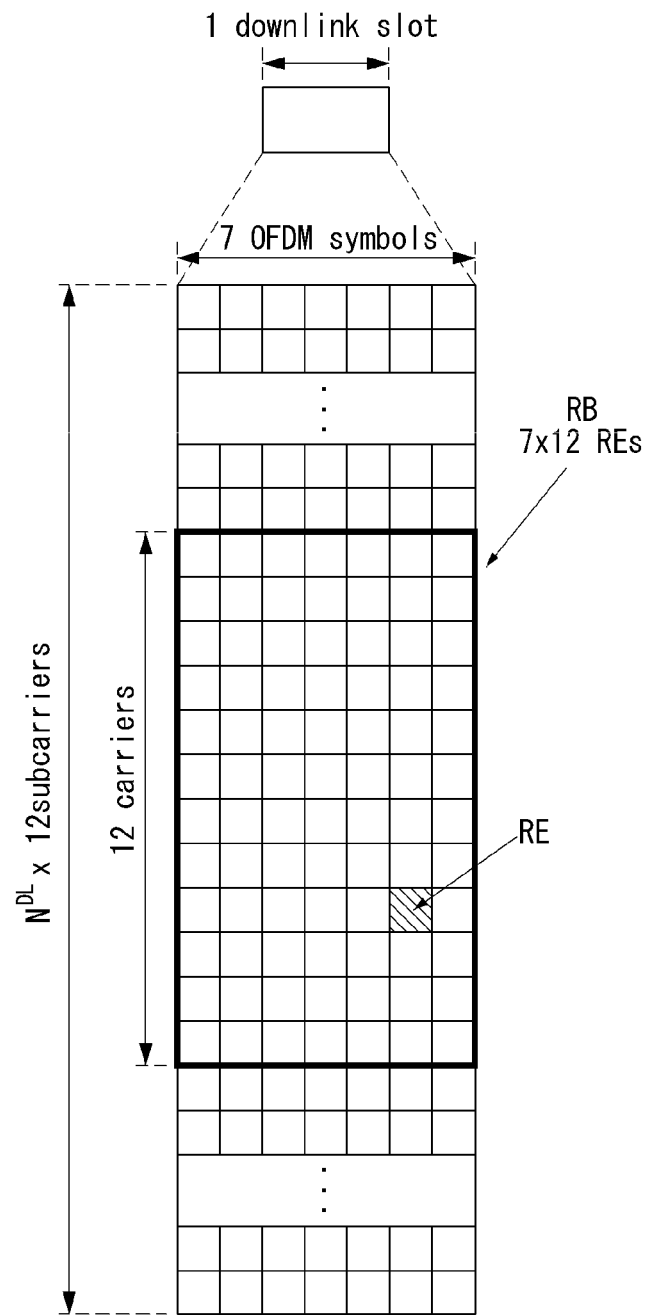
[Figure 5]

[Figure 6]
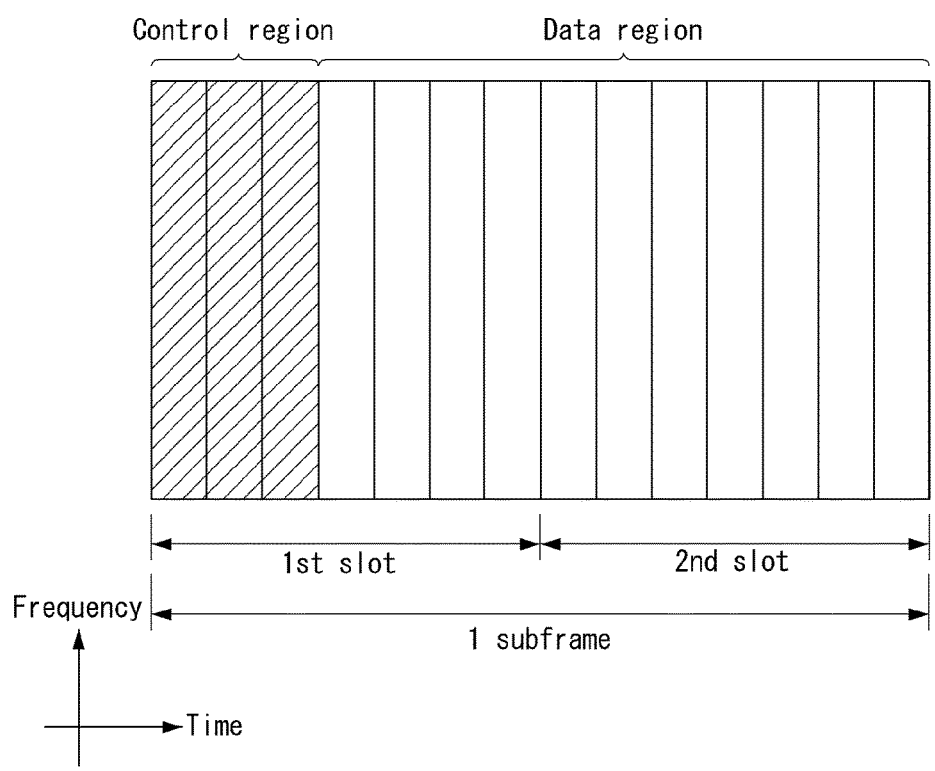

[Figure 7]
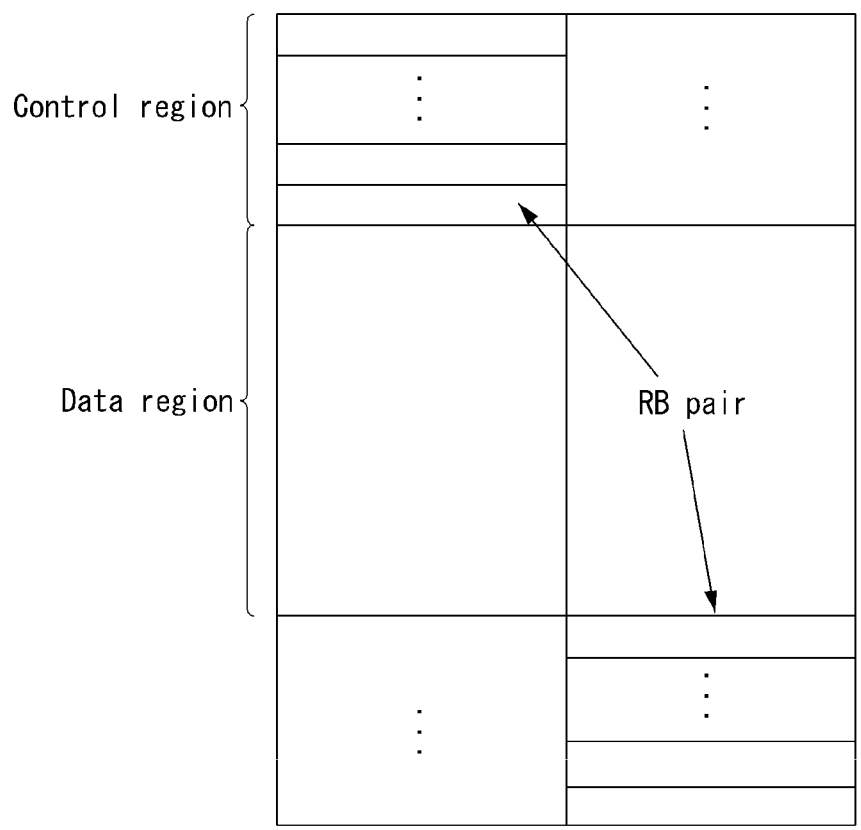

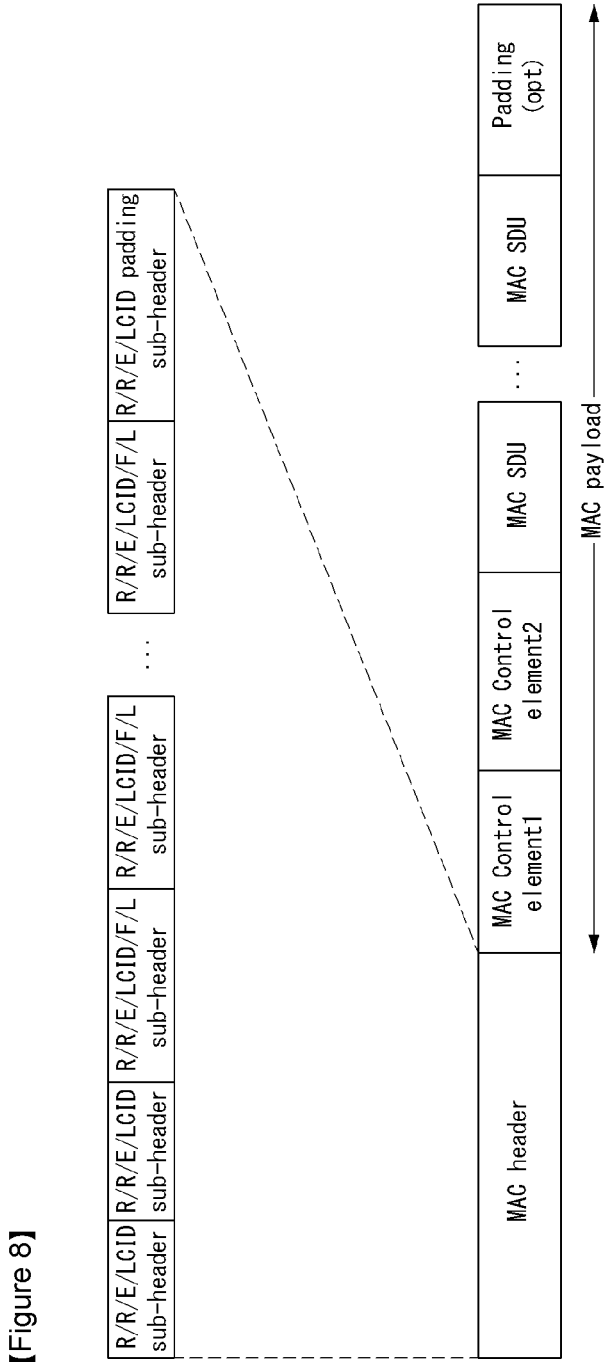
[Figure 8]

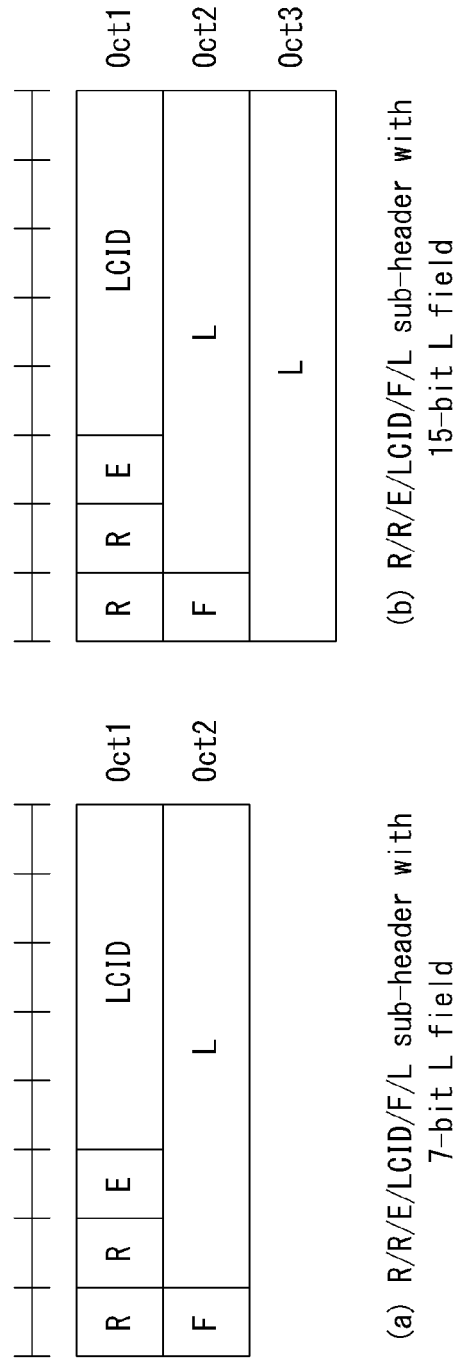
[Figure 9]
(a) R/R/E/LCID/F/L sub-header with 7-bit L field
(b) R/R/E/LCID/F/L sub-header with 15-bit L field

[Figure 10]
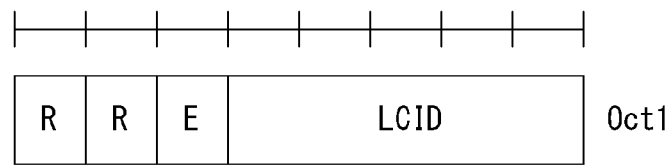
R/R/E/LCID sub-header

[Figure 11]
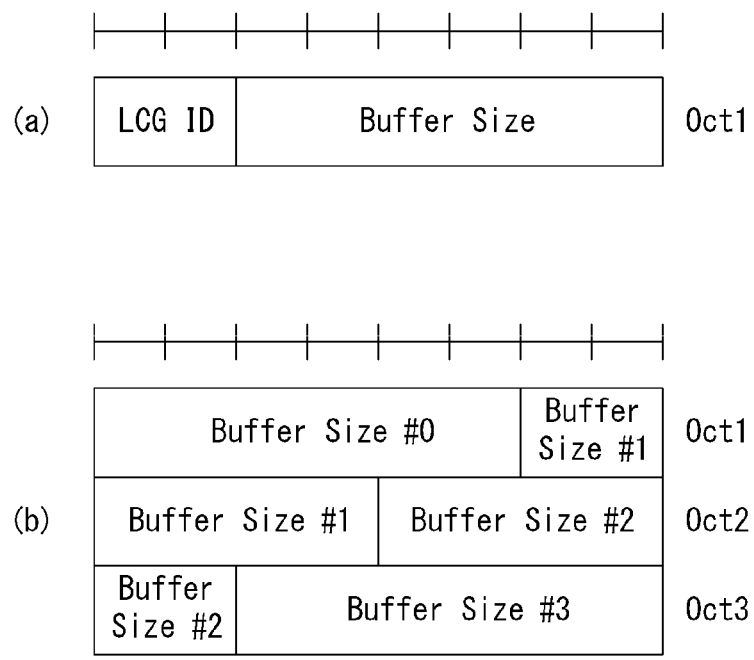

[Figure 12]
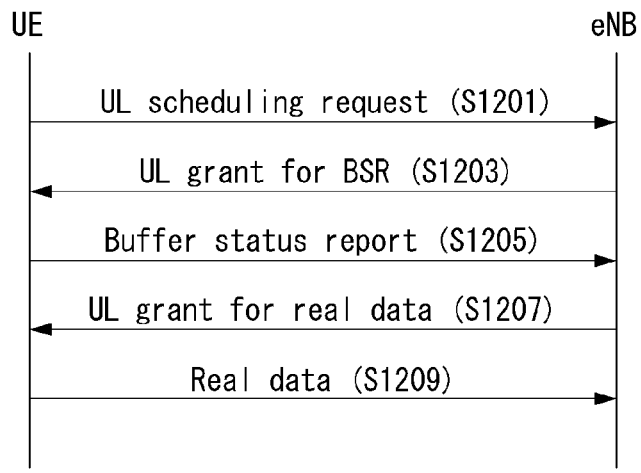
(a)
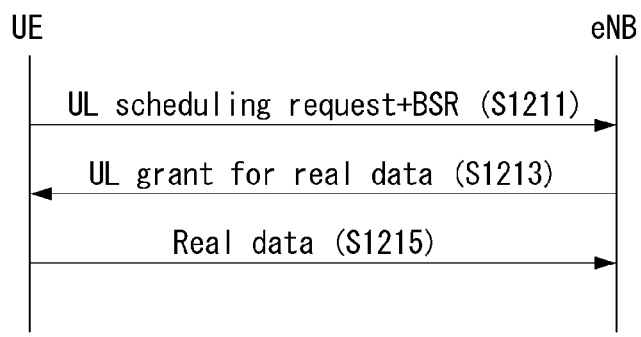
(b)

[Figure 13]
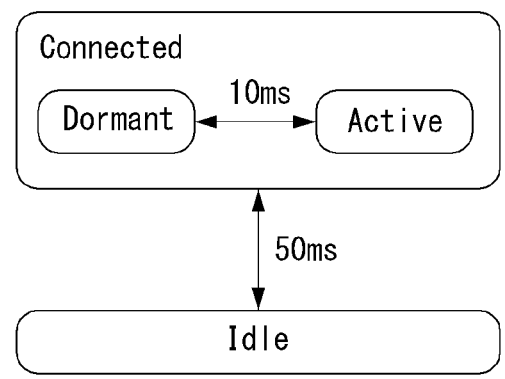

[Figure 14]
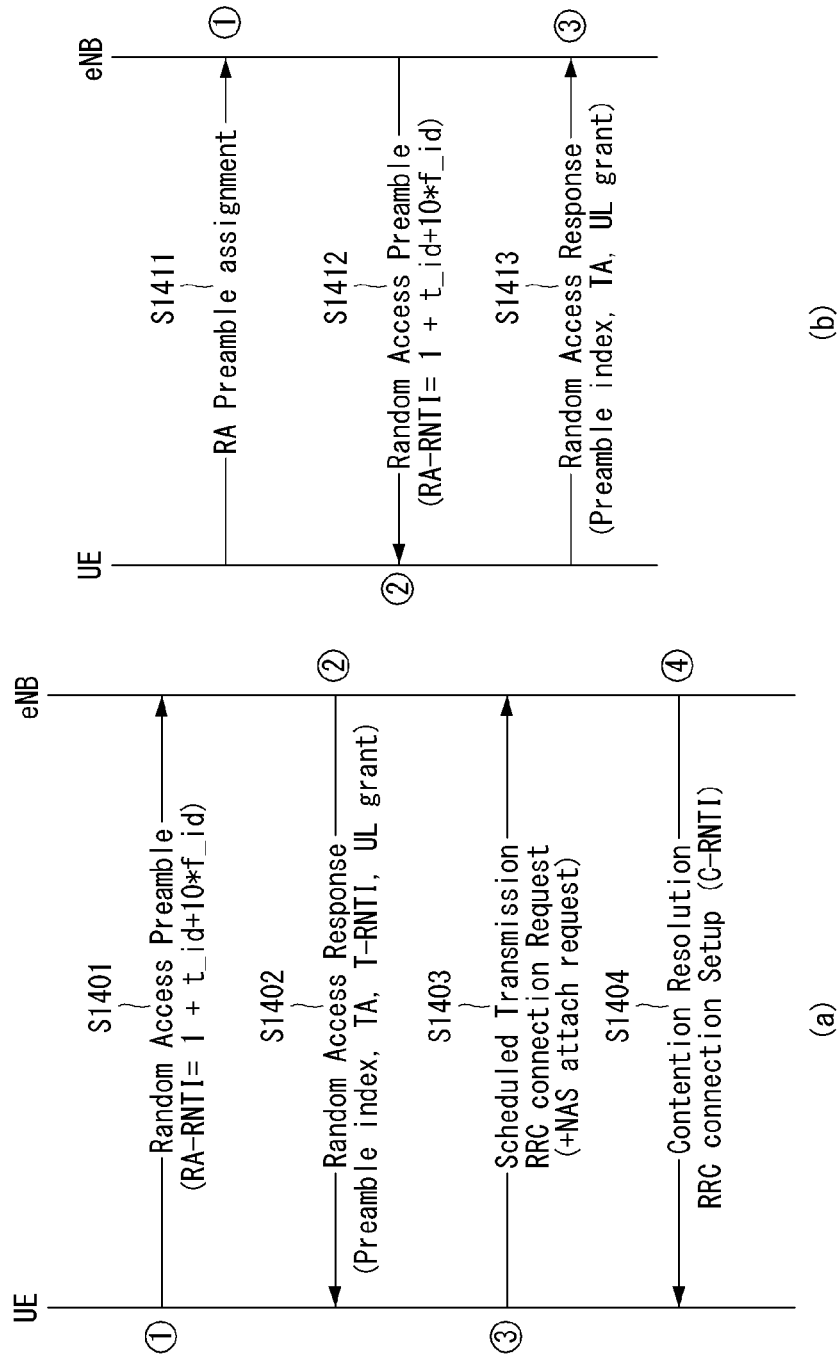

[Figure 15]
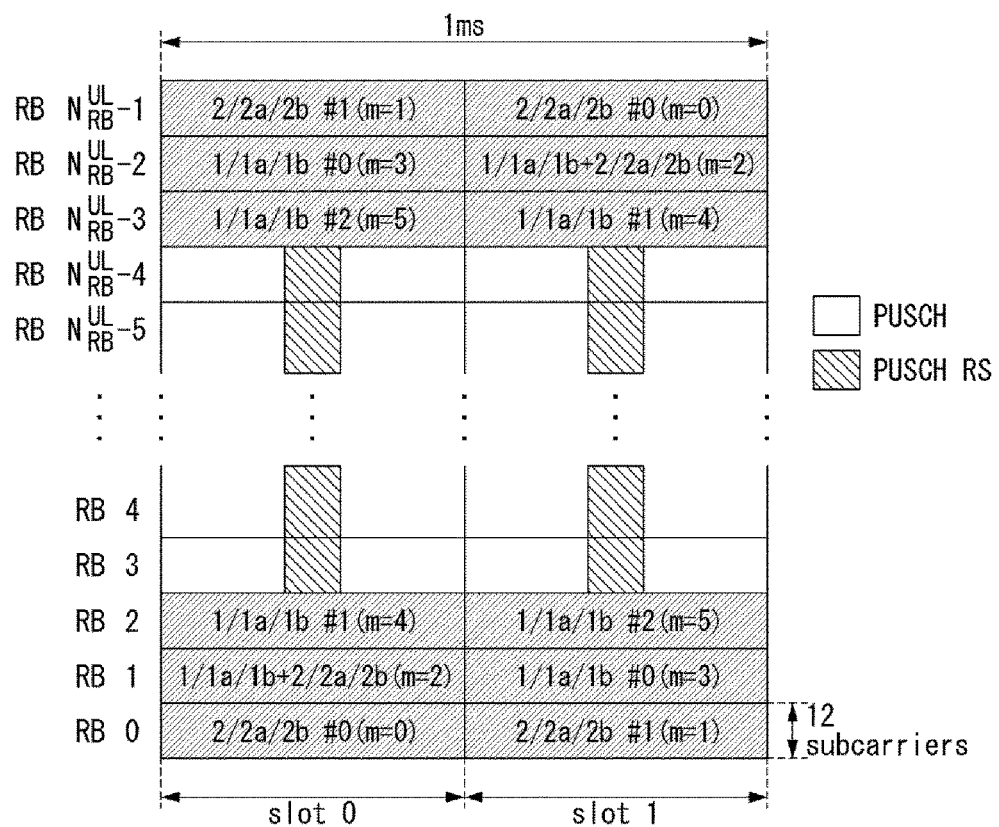

[Figure 16]
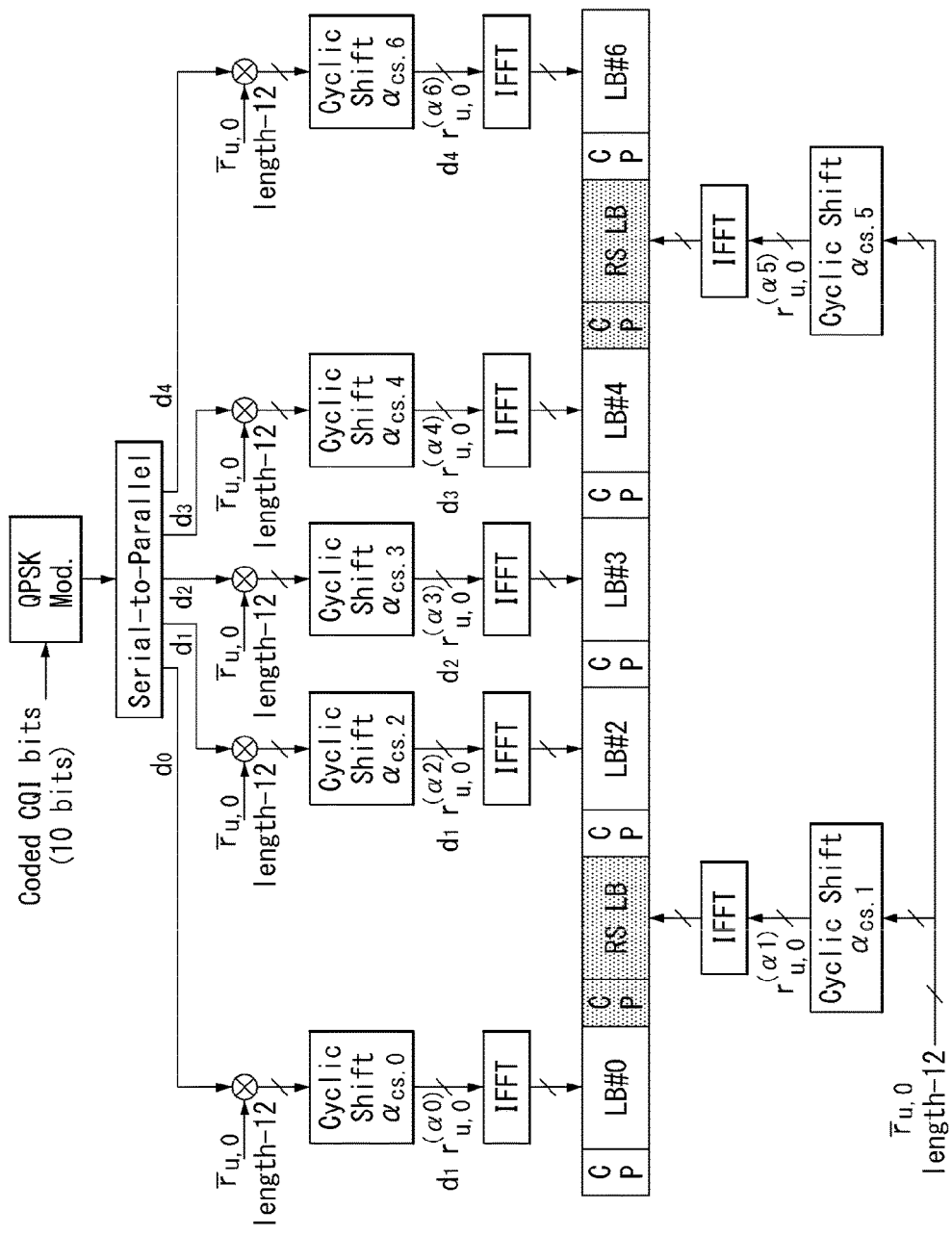

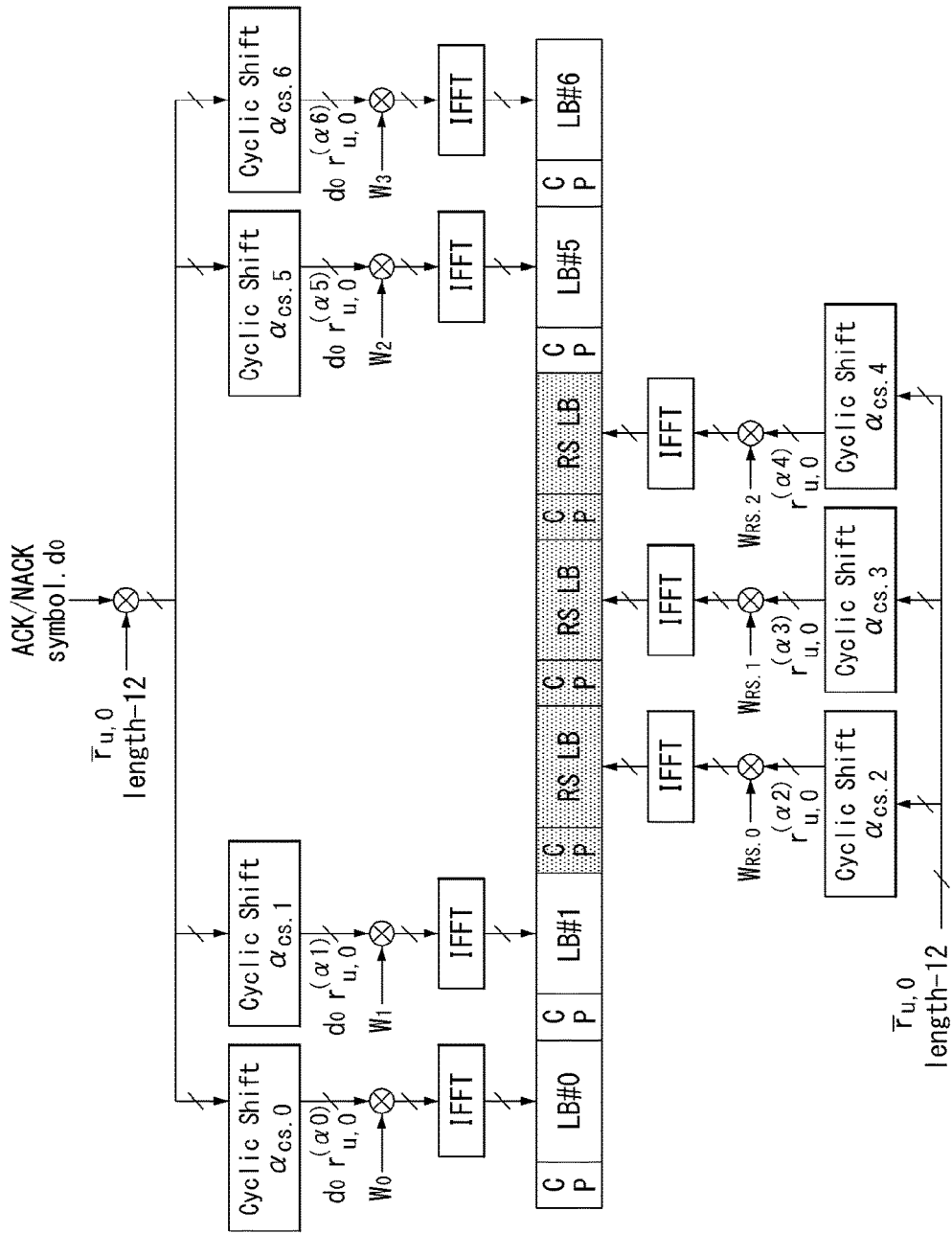
[Figure 17]

[Figure 18]
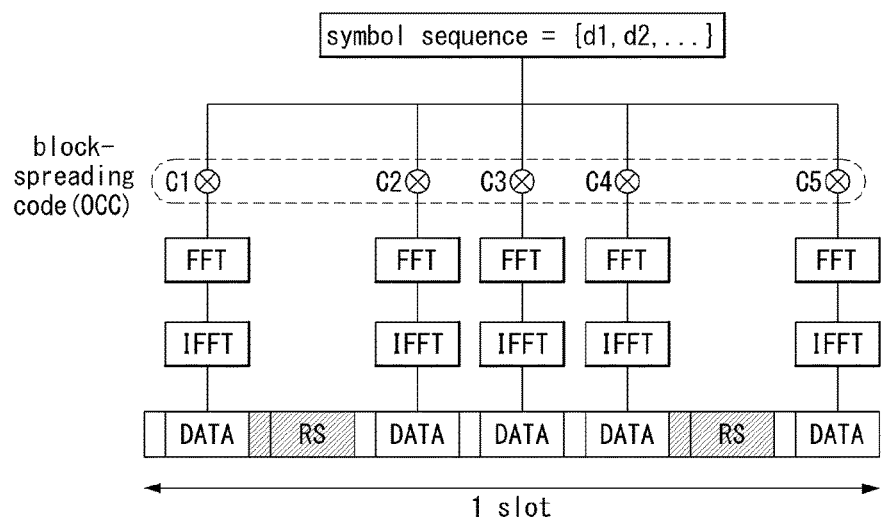

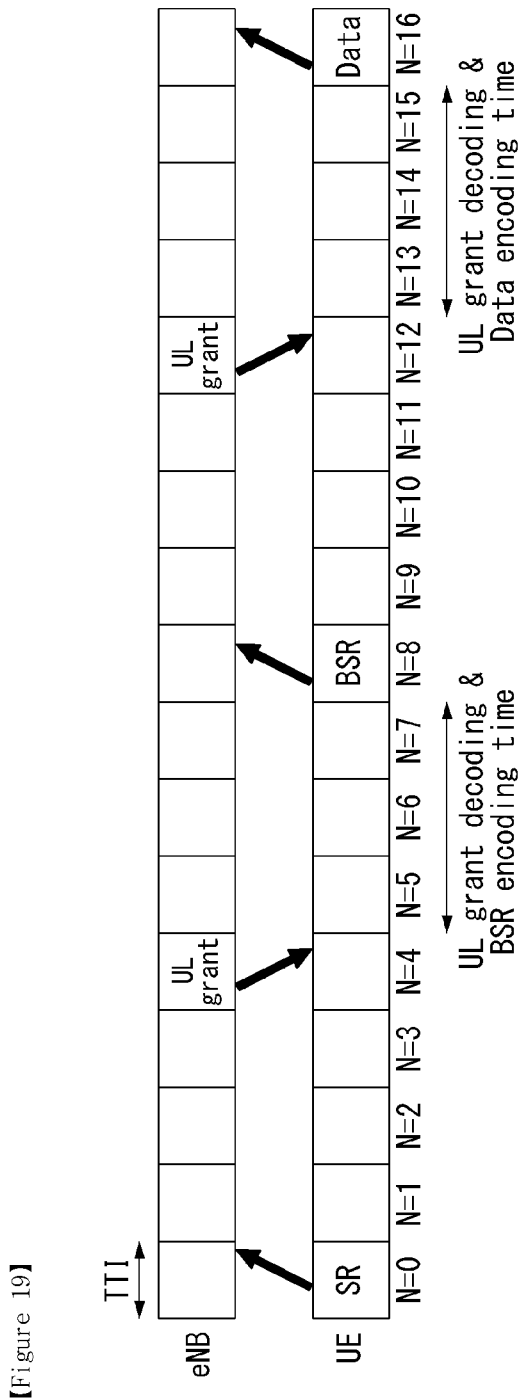
[Figure 19]

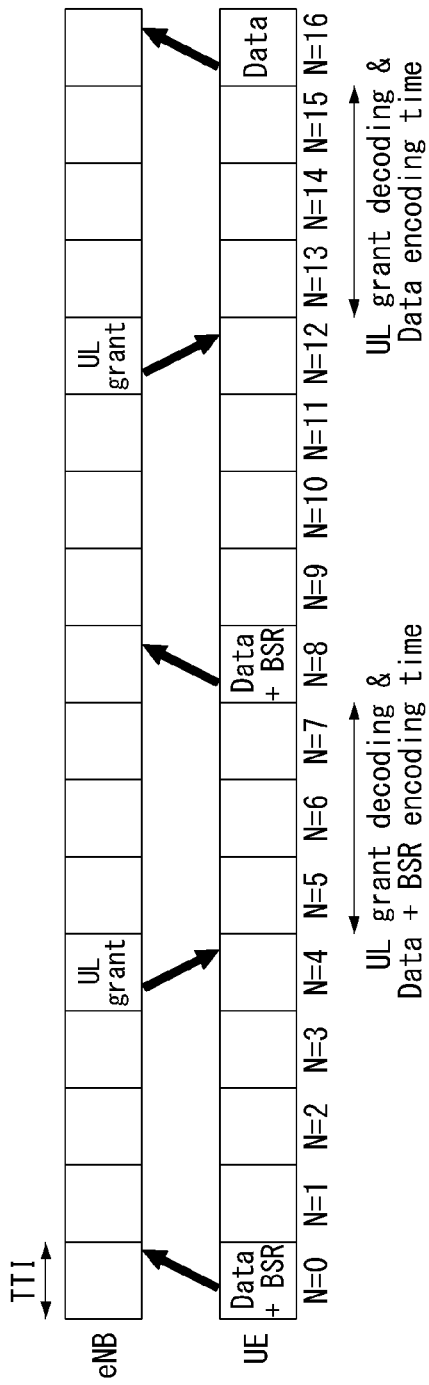

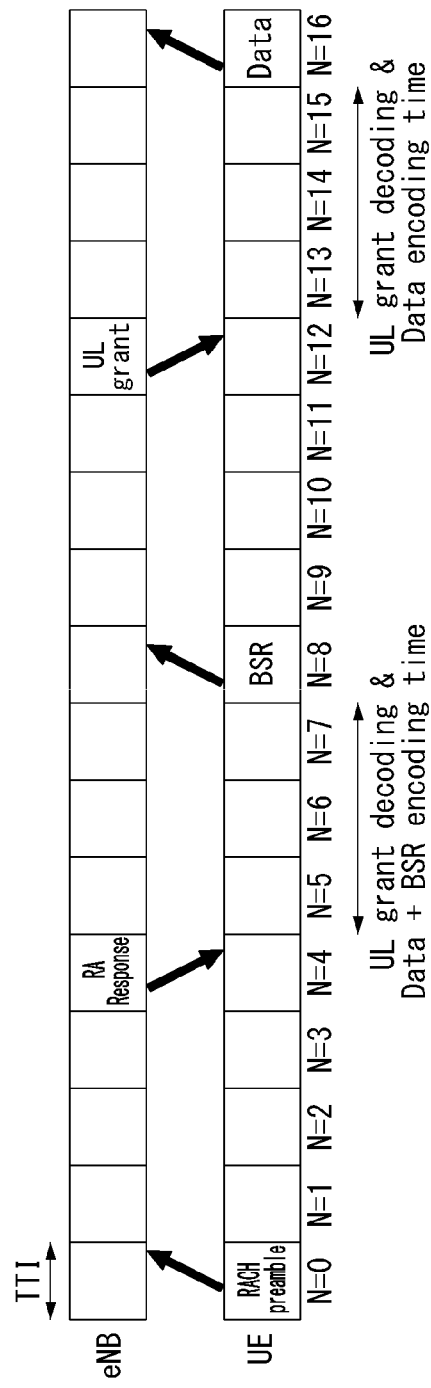
[Figure 21]

[Figure 22]
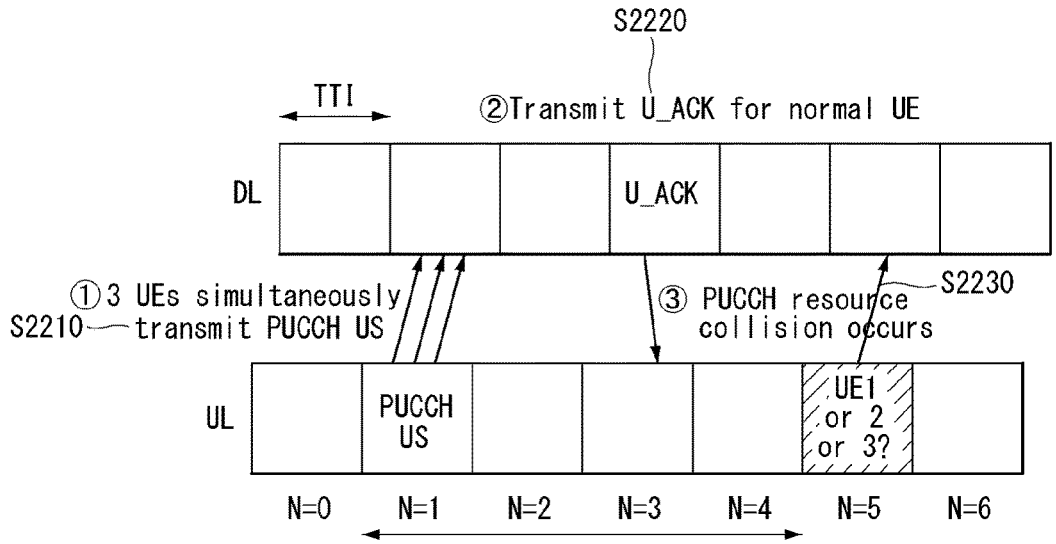
[Figure 23]
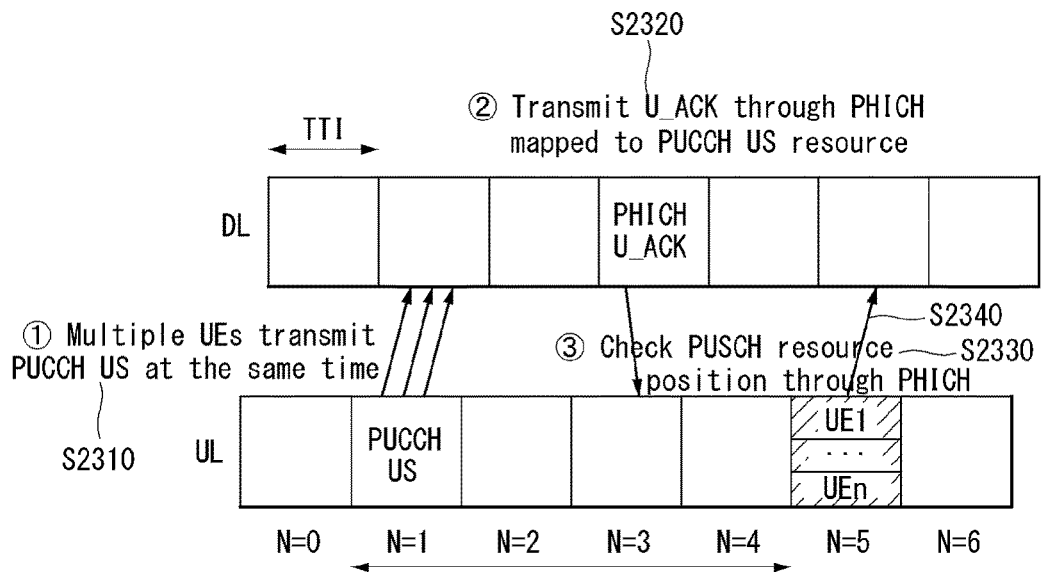

[Figure 24]
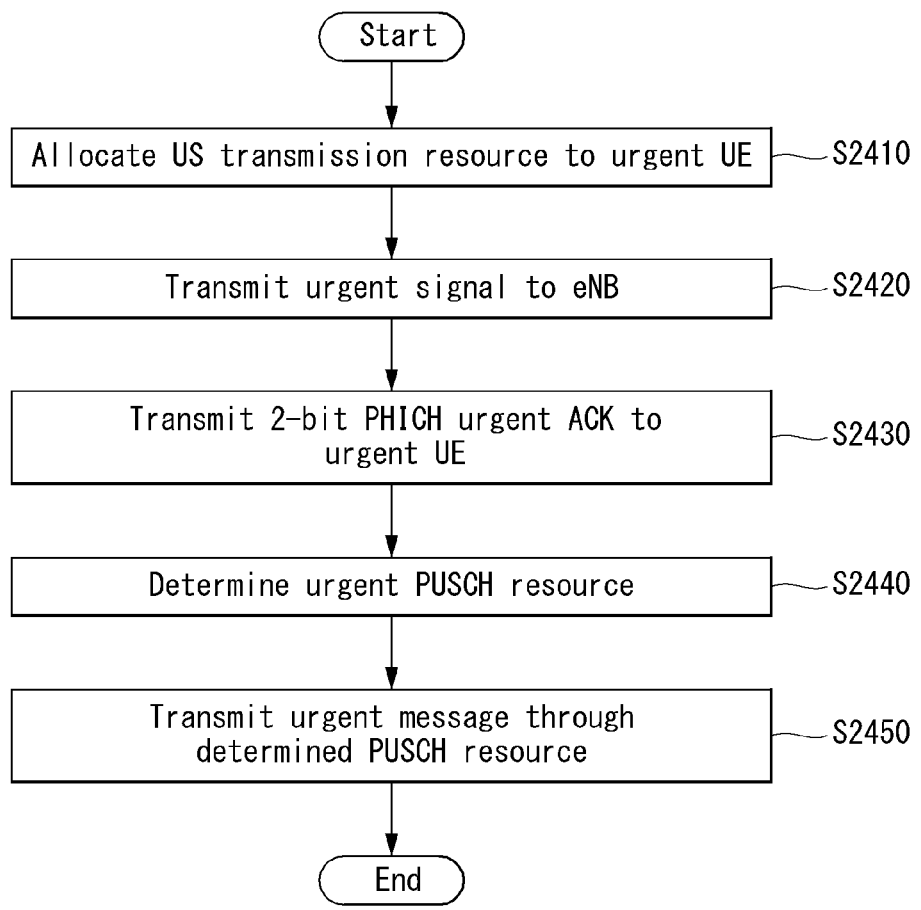

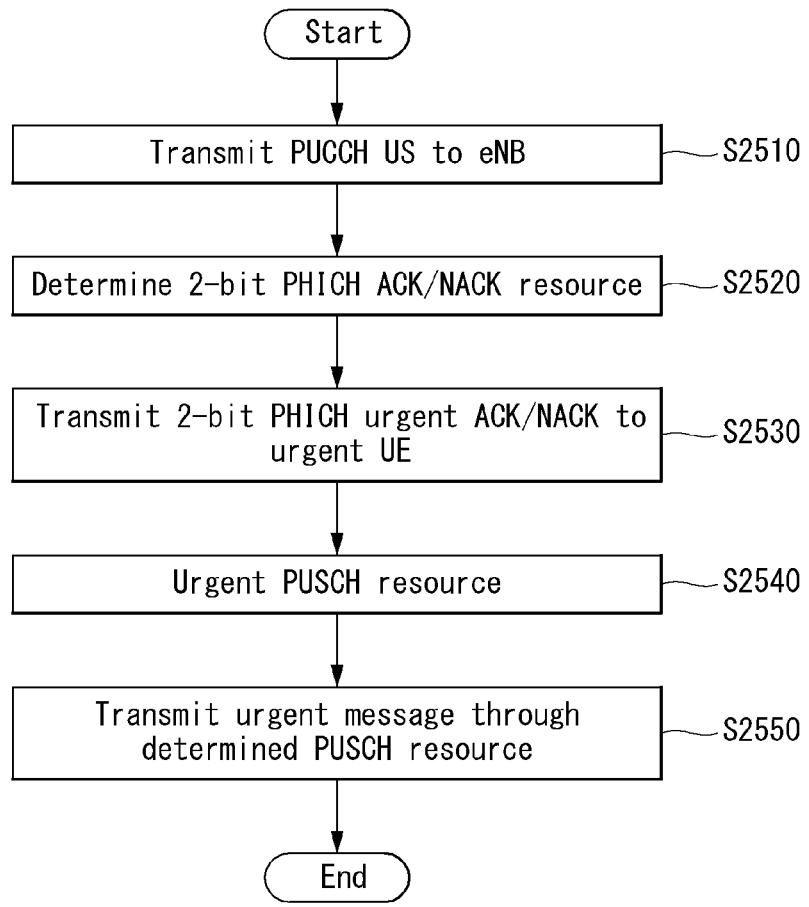
[Figure 25]

[Figure 26]
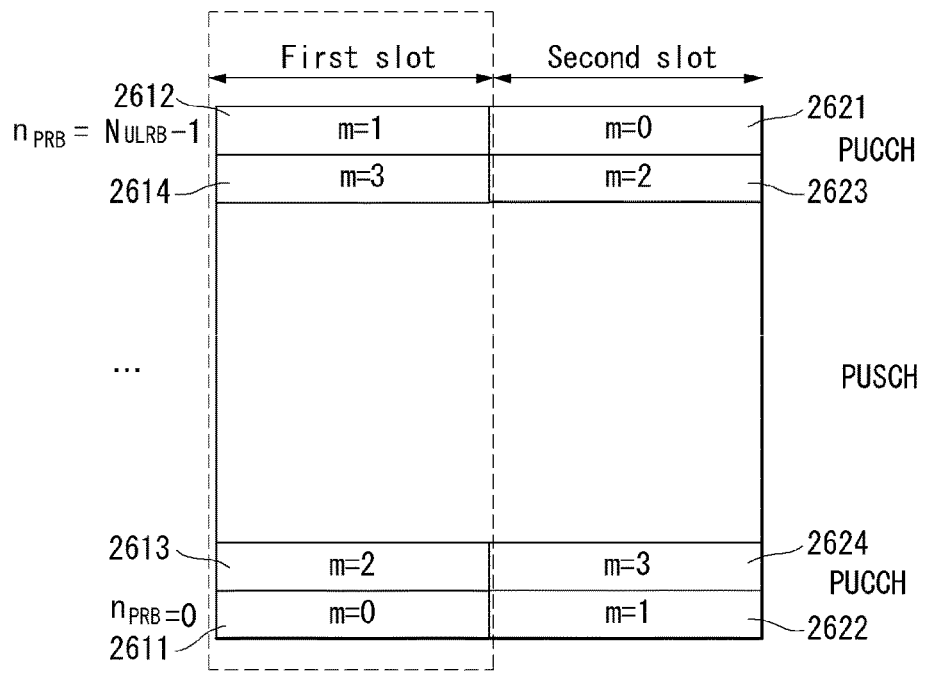
[Figure 27]
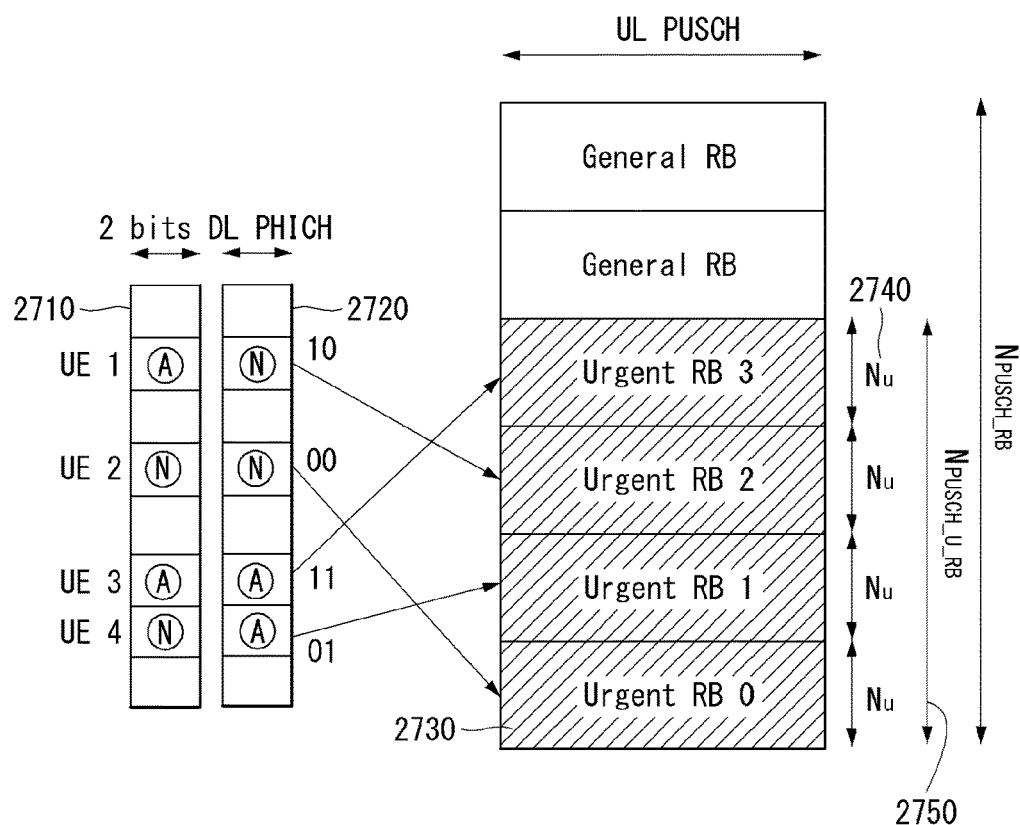

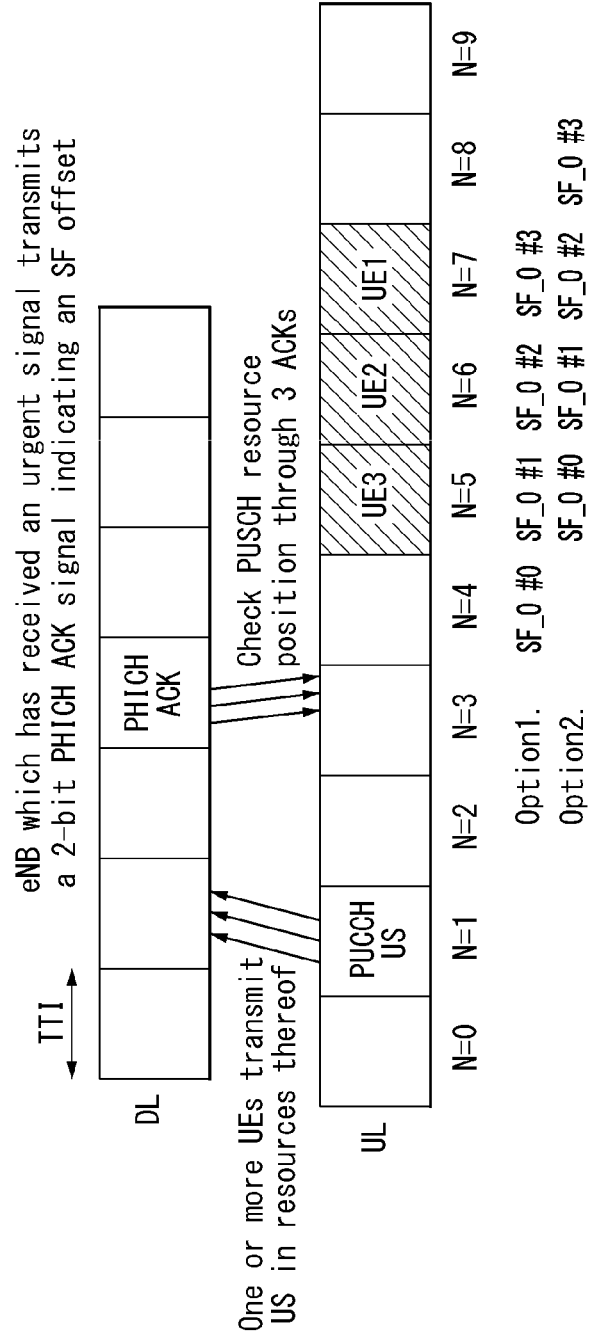
[Figure 28]

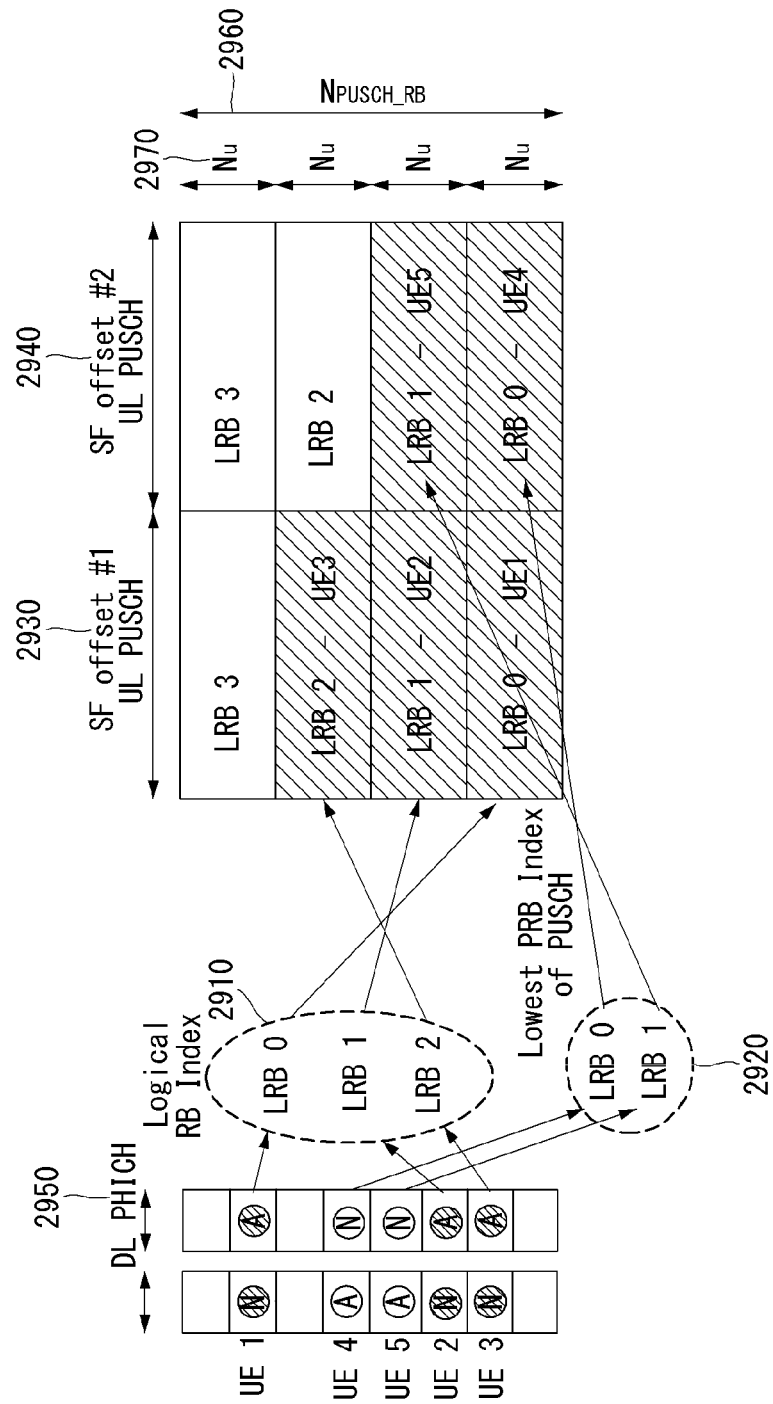
[Figure 29]

[Figure 30]
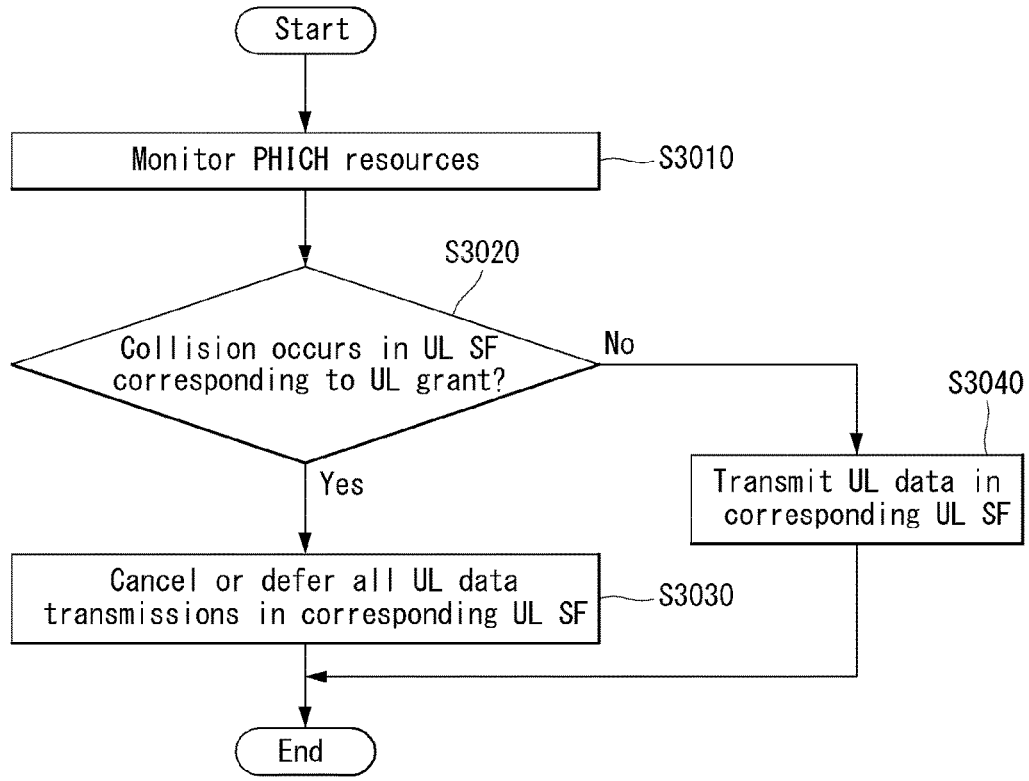
[Figure 31]
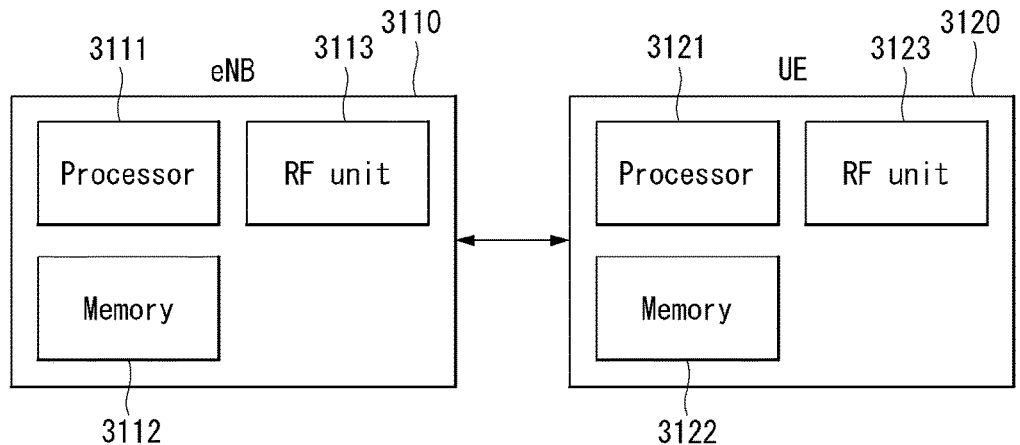

METHOD FOR TRANSMITTING UPLINK DATA IN WIRELESS COMMUNICATION SYSTEM AND DEVICE FOR SAME

CROSS-REFERENCE TO RELATED APPLICATIONS

This application is the National Phase of PCT International Application No. PCT/KR2015/004466, filed on May 4, 2015, which is hereby expressly incorporated by reference into the present application.

TECHNICAL FIELD

The present invention relates to a wireless communication system and, more specifically, relates to a method for a UE to transmit uplink data to a base station and an apparatus supporting the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

An object of this specification is to provide a method for transmitting data related to an urgent situation prior to other pieces of data when an event related to the urgent situation occurs.

In addition, an object of this specification is to provide a method for determining resources for urgent data transmission by transmitting ACK for transmission of urgent signals mapped to an urgent signal transmission resource to urgent UEs.

Furthermore, an object of this specification is to provide a method for allocating resources related to urgent data transmission through control of an eNB to prevent collision between urgent data transmissions.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In this specification, a method for transmitting, by a first UE, uplink (UL) data in a wireless communication system supporting a low latency service includes: transmitting, to a base station, an urgent signal (US) for providing notice of occurrence of an event related to an urgent situation; receiving a response to the urgent signal from the base station through two physical HARQ indication channel (PHICH) resources; and transmitting, to the base station, urgent data including detailed information related to the event that has occurred on the basis of the received response, wherein each of the PHICH resources is determined by a physical resource block (PRB) index of a resource through which the urgent signal is transmitted.

In this specification, each of the PHICH resources has an index pair form, and a 2-bit response to the urgent signal is received through the two PHICH resources.

In this specification, the method further includes allocating, by the base station, a transmission resource of the urgent signal through an RRC connection establishment procedure.

In this specification, the allocating of the transmission resource of the urgent signal includes receiving a demodulation reference signal (DMRS) value for each first UE.

In this specification, the transmission resource of the urgent signal is a physical uplink control channel (PUCCH) resource, and the two PHICH resources are determined on the basis of the DMRS value, a PRB index of the first slot of the PUCCH resource and a PRB index of the second slot of the PUCCH resource.

In this specification, the PRB index of the first slot and the PRB index of the second slot are related to a resource for transmission of one urgent signal, and the PRB index of the first slot and the PRB index of the second slot are in a frequency hopping relationship.

In this specification, one of the two PHICH resources is determined by the PRB index of the first slot of the PUCCH resource and the other is determined on the basis of the PRB index of the second slot of the PUCCH resource.

In this specification, the response to the urgent signal is notification information indicating a PUSCH urgent resource position, subframe offset information indicating a start point of a physical uplink shared channel (PUSCH) urgent resource or information indicating a modulation and coding scheme (MCS) level and resource size of the PUSCH urgent resource.

In this specification, the method further includes determining a resource position for transmitting the UL data on the basis of the response received through the two PHICH resources.

In this specification, the determining of the resource position includes: monitoring whether other first UEs receive PHICH urgent ACK; calculating first LRB index information related to the number of PHICH urgent ACKs received by the other first UEs before PHICH urgent ACK is received from the base station and second LRB index information related to a total number of PHICH urgent ACKs received by the other first UEs; and determining a PRB index of a resource for transmitting urgent data on the basis of the calculated first LRB index information and second LRB index information.

In this specification, the determining of the resource position is performed when PHICH urgent ACKs of the other first UEs are received in the same subframe offset.

In this specification, the first LRB index information increases by "1" whenever the other first UEs receive PHICH urgent ACK.

In this specification, the second LRB index information is a value obtained by adding 1 to the total number of PHICH ACKs received by the other first UEs.

In this specification, the response to the urgent signal is ACK or NACK.

In this specification, a method for transmitting, by a base station, UL data in a wireless communication system supporting a low latency service includes: receiving, from an urgent UE, an urgent signal (US) providing notice of occurrence of an event related to an urgent situation; determining two PHICH resources for transmitting a response to the urgent signal on the basis of the received urgent signal; transmitting the response to the urgent signal to the urgent UE through the determined two PHICH resources; and receiving, from the urgent UE, urgent data including detailed information related to the event that has occurred, wherein each of the PHICH resources is determined by a PRB index of a resource through which the urgent signal is transmitted.

In this specification, the transmission resource of the urgent signal is a PUCCH resource, and the two PHICH resources are determined on the basis of a DMRS value, a PRB index of the first slot of the PUCCH resource and a PRB index of the second slot of the PUCCH resource.

In this specification, the DMRS value is allocated per urgent UE.

In this specification, a UE for transmitting UL data in a wireless communication system supporting a low latency service includes: a radio frequency (RF) unit configured to transmit/receive RF signals; and a processor functionally connected to the RF unit, wherein the processor is configured: to transmit an urgent signal (US) for providing notice of occurrence of an event related to an urgent situation to a base station; to receive a response to the urgent signal from the base station through two PHICH resources; and to transmit urgent data including detailed information related to the event that has occurred to the base station on the basis of the received response, wherein each of the PHICH resources is determined by a physical resource block (PRB) index of a resource through which the urgent signal is transmitted.

Advantageous Effects

According to this specification, a UE placed in an urgent situation can rapidly notify an eNB of the urgent situation and exclusively occupy uplink resources more rapidly compared to conventional technology.

Rapid exclusive occupation of uplink resources by the urgent UE can cause an urgent message to be transmitted to the eNB more safely without error (the urgent UE can secure one SF resource to generate and transmit a message robust to error) to guarantee reliability as well as latency.

In addition, according to this specification, even if one or more urgent UEs transmit PUCCH US, positions of urgent PUSCH resources of the UEs can be detected through reception of PHICH urgent ACK from the eNB and urgent messages can be rapidly transmitted without collision with other urgent or normal UEs.

That is, this specification provides a resource occupation method according to eNB control instead of a method using contention-based resources, and thus a resource collision problem which may be generated in a contention-based resource occupation method can be solved and safer messages robust to error can be transmitted.

Furthermore, in the uplink data transmission method proposed by this specification, a time corresponding to (4 or 5)*N can be taken from PHICH ACK reception and PUSCH US transmission according to TA between a UE and an eNB to actual urgent data transmission.

This can reduce a time corresponding to 12*N or 13*N compared to the conventional technology (which requires 17*N) while providing the same reliability as the conventional method for transmitting uplink data through an SR.

Here, N refers to a time to interval (TTI) and is 1 ms in the case of LTE(-A) system.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings included as part of the detailed description in order to help understanding of the present invention provide embodiments of the present invention and describe the technical characteristics of the present invention along with the detailed description.

FIG. 1 illustrates an example of the network configuration of an evolved universal terrestrial radio access network (E-UTRAN) to which an embodiment of the present invention may be applied.

FIG. 2 illustrates the structure of a radio interface protocol between a UE and an E-UTRAN in a wireless communication system to which an embodiment of the present invention may be applied.

FIG. 3 is a diagram illustrating physical channels used in a 3GPP LTE/LTE-A system to which an embodiment of the present invention may be applied and a known signal transmission method using the physical channels.

FIG. 4 illustrates the structure of a radio frame in 3GPP LTE/LTE-A to which an embodiment of the present invention may be applied.

FIG. 5 is a diagram illustrating a resource grid for a single DL slot in a wireless communication system to which an embodiment of the present invention may be applied.

FIG. 6 illustrates the structure of a DL subframe in a wireless communication system to which an embodiment of the present invention may be applied.

FIG. 7 illustrates the structure of an UL subframe in a wireless communication system to which an embodiment of the present invention may be applied.

FIG. 8 is a diagram illustrating an example of an MAC PDU used in an MAC entity in a wireless communication system to which an embodiment of the present invention may be applied.

FIGS. 9 and 10 illustrate the subheader of the MAC PDU in a wireless communication system to which an embodiment of the present invention may be applied.

FIG. 11 is a diagram illustrating an example of the format of an MAC control element for a buffer status report in a wireless communication system to which an embodiment of the present invention may be applied.

FIG. 12 is a diagram illustrating an example of a process of allocating UL resources to a UE in a wireless communication system to which an embodiment of the present invention may be applied.

FIG. 13 is a diagram illustrating latency in a control plane (C-plane) that is required in 3GPP LTE-A to which an embodiment of the present invention may be applied.

FIG. 14 is a diagram illustrating an example of a random access procedure to which an embodiment of the present invention may be applied.

FIG. 15 shows an example of a form in which PUCCH formats are mapped to PUCCH regions in a wireless communication system to which an embodiment of the present invention may be applied.

FIG. 16 shows the structure of a CQI channel in the case of a common CP in a wireless communication system to which an embodiment of the present invention may be applied.

FIG. 17 shows the structure of an ACK/NACK channel in the case of a common CP in a wireless communication system to which an embodiment of the present invention may be applied.

FIG. 18 shows an example in which five SC-FDMA symbols are generated and transmitted for one slot in a wireless communication system to which an embodiment of the present invention may be applied.

FIGS. 19 and 20 are diagrams showing examples of a method of transmitting actual data through a scheduling request and a BSR procedure.

FIG. 21 is a diagram showing an example of a method of transmitting actual data through an RACH procedure.

FIG. 22 is a diagram showing an example of an UL data transmission method for supporting a low latency service.

FIG. 23 is a diagram showing an example of an urgent UL data transmission method proposed by this specification.

FIGS. 24 and 25 are flowcharts illustrating examples of a method for transmitting urgent uplink data proposed in this specification.

FIG. 26 illustrates an example of a PUCCH physical resource block index (PRB index) for PHICH resource configuration proposed in this specification.

FIGS. 27 to 29 illustrate examples of a method of determining urgent resources for transmitting an urgent message proposed in this specification.

FIG. 30 is a flowchart illustrating an example of a PUSCH transmission method of normal UEs proposed in this specification.

FIG. 31 is a block diagram of a wireless communication apparatus to which the methods proposed in this specification are applicable.

BEST MODE

Hereinafter, some embodiments of the present invention are described in detail with reference to the accompanying drawings. The detailed description to be disclosed herein along with the accompanying drawings is provided to describe exemplary embodiments of the present invention and is not intended to describe a sole embodiment in which the present invention may be implemented. The following detailed description includes detailed contents in order to provide complete understanding of the present invention. However, those skilled in the art will appreciate that the present invention may be implemented even without such detailed contents.

In some instances, known structures and devices are omitted, or are shown in block diagram form focusing on important features of the structures and devices, so as not to obscure the concept of the present invention.

In this specification, an enhanced Node B (eNode B or eNB) may be a terminal node of a network, which directly communicates with the terminal. In this document, a specific operation described as performed by the eNB may be performed by an upper node of the eNB. Namely, it is apparent that, in a network comprised of a plurality of network nodes including an eNB, various operations performed for communication with a terminal may be performed by the eNB, or network nodes other than the eNB. The term 'eNB' may be replaced with the term 'fixed station', 'base station (BS)', 'Node B', 'base transceiver system (BTS),', 'access point (AP)', etc. The term 'user equipment (UE)' may be replaced with the term 'terminal', 'mobile station (MS)', 'user terminal (UT)', 'mobile subscriber station (MSS)', 'subscriber station (SS)', 'Advanced Mobile Station (AMS)', 'Wireless terminal (WT)', 'Machine-Type Communication (MTC) device', 'Machine-to-Machine (M2M) device', 'Device-to-Device (D2D) device', wireless device, etc.

Hereinafter, "downlink (DL)" refers to communication from an eNB to a UE, and "uplink (UL)" refers to communication from a UE to an eNB. In downlink, a transmitter may be part of eNB, and a receiver may be part of UE. In uplink, a transmitter may be part of a UE, and a receiver may be part of an eNB.

Specific terms used for the embodiments of the present invention are provided to aid in understanding of the present invention. These specific terms may be replaced with other terms within the scope and spirit of the present invention.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), 'non-orthogonal multiple access (NOMA)', etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE.

The embodiments of the present invention may be supported by the standard documents disclosed in at least one of IEEE 802, 3GPP and 3GPP2, that is, wireless access systems. That is, steps or portions not described to clearly disclose the technological spirit of the present invention in the embodiments of the present invention may be supported by the documents. Furthermore, all the terms disclosed in this document may be described by the standard documents.

For clarity, this application focuses on the 3GPP LTE/LTE-A system. However, the technical features of the present invention are not limited thereto.

General System to which the Present Invention May be Applied

FIG. 1 illustrates a schematic structure a network structure of an evolved universal mobile telecommunication system (E-UMTS) to which the present invention can be applied.

An E-UMTS system is an evolved version of the UMTS system. For example, the E-UMTS may be also referred to as an LTE/LTE-A system. The E-UMTS is also referred to as a Long Term Evolution (LTE) system.

The E-UTRAN consists of eNBs, providing the E-UTRA user plane and control plane protocol terminations towards the UE. The eNBs are interconnected with each other by means of the X2 interface. The X2 user plane interface (X2-U) is defined between eNBs. The X2-U interface provides non guaranteed delivery of user plane packet data units (PDUs). The X2 control plane interface (X2-CP) is defined between two neighbour eNBs. The X2-CP performs following functions: context transfer between eNBs, control of user plane tunnels between source eNB and target eNB, transfer of handover related messages, uplink load management and the like. Each eNB is connected to User Equipments (UEs) through a radio interface and is connected to an Evolved Packet Core (EPC) through an S1 interface. The S1 user plane interface (S1-U) is defined between the eNB and the serving gateway (S-GW). The S1-U interface provides non guaranteed delivery of user plane PDUs between the eNB and the S-GW. The S1 control plane interface (S1-MME) is defined between the eNB and the MME (Mobility Management Entity). The S1 interface performs following functions: EPS (Enhanced Packet System) Bearer Service Management function, NAS (Non-Access Stratum) Signaling Transport function, Network Sharing Function, MME Load balancing Function and the like. The S1 interface supports a many-to-many relation between MMEs/S-GWs and eNBs.

FIG. 2 illustrates the configurations of a control plane and a user plane of a radio interface protocol between the E-UTRAN and a UE in the wireless communication system to which the present invention can be applied.

FIG. 2(a) shows the respective layers of the radio protocol control plane, and FIG. 2(b) shows the respective layers of the radio protocol user plane.

Referring to the FIG. 2, the protocol layers of a radio interface protocol between the E-UTRAN and a UE can be divided into an L1 layer (first layer), an L2 layer (second layer), and an L3 layer (third layer) based on the lower three layers of the Open System Interconnection (OSI) reference model widely known in communication systems. The radio interface protocol is divided horizontally into a physical layer, a data link layer, and a network layer, and vertically into a user plane for data transmission and a control plane for signaling.

The control plane is a passage through which control messages that a UE and a network use in order to manage calls are transmitted. The user plane is a passage through which data (e.g., voice data or Internet packet data) generated at an application layer is transmitted. The following is a detailed description of the layers of the control and user planes in a radio interface protocol.

The control plane is a passage through which control messages that a UE and a network use in order to manage calls are transmitted. The user plane is a passage through which data (e.g., voice data or Internet packet data) generated at an application layer is transmitted. The following is a detailed description of the layers of the control and user planes in a radio interface protocol.

The MAC layer of the second layer provides a service to a Radio Link Control (RLC) layer, located above the MAC layer, through a logical channel. The MAC layer plays a role in mapping various logical channels to various transport channels. And, the MAC layer also plays a role as logical channel multiplexing in mapping several logical channels to one transport channel.

The RLC layer of the second layer supports reliable data transmission. The RLC layer performs segmentation and concatenation on data received from an upper layer to play a role in adjusting a size of the data to be suitable for a lower layer to transfer the data to a radio section. And, the RLC layer provides three kinds of RLC modes including a transparent mode (TM), an unacknowledged mode (UM) and an acknowledged mode (AM) to secure various kinds of QoS demanded by each radio bearer (RB). In particular, the AM RLC performs a retransmission function through automatic repeat and request (ARQ) for the reliable data transfer. The functions of the RLC layer may also be implemented through internal functional blocks of the MAC layer. In this case, the RLC layer need not be present.

A packet data convergence protocol (PDCP) layer of the second layer performs a header compression function for reducing a size of an IP packet header containing relatively large and unnecessary control information to efficiently transmit such an IP packet as IPv4 and IPv6 in a radio section having a small bandwidth. This enables a header part of data to carry mandatory information only to play a role in increasing transmission efficiency of the radio section. Moreover, in the LTE/LTE-A system, the PDCP layer performs a security function as well. This consists of ciphering for preventing data interception conducted by a third party and integrity protection for preventing data manipulation conducted by a third party.

A Radio Resource Control (RRC) layer located at the bottom of the third layer is defined only in the control plane and is responsible for control of logical, transport, and physical channels in association with configuration, re-configuration, and release of Radio Bearers (RBs). The RB is a logical path that the second layer provides for data communication between the UE and the E-UTRAN. To accomplish this, the RRC layer of the UE and the RRC layer of the network exchange RRC messages. To Configure of Radio Bearers means that the radio protocol layer and the characteristic of channels are defined for certain service and that each of specific parameters and operating method are configured for certain service. The radio bearer can be divided signaling radio bearer (SRB) and data radio bearer (DRB). The SRB is used as a path for transmission RRC messages in the control plane, and the DRB is used as a path for transmission user data in the user plane.

A Non-Access Stratum (NAS) layer located above the RRC layer performs functions such as session management and mobility management.

One cell of the eNB is set to use a bandwidth such as 1.25, 2.5, 5, 10 or 20 MHz to provide a downlink or uplink transmission service to UEs. Here, different cells may be set to use different bandwidths.

Downlink transport channels for transmission of data from the network to the UE include a Broadcast Channel (BCH) for transmission of system information, a Paging Channel (PCH) for transmission of paging messages, and a downlink Shared Channel (DL-SCH) for transmission of user traffic or control messages. User traffic or control messages of a downlink multicast or broadcast service may be transmitted through DL-SCH and may also be transmitted through a downlink multicast channel (MCH). Uplink transport channels for transmission of data from the UE to the network include a Random Access Channel (RACH) for transmission of initial control messages and an uplink SCH (UL-SCH) for transmission of user traffic or control messages.

Logical channels, which are located above the transport channels and are mapped to the transport channels, include a Broadcast Control Channel (BCCH), a Paging Control Channel (PCCH), a Common Control Channel (CCCH), a dedicated control channel (DCCH), a Multicast Control Channel (MCCH), a dedicated traffic channel (DTCH), and a Multicast Traffic Channel (MTCH).

As an downlink physical channel for transmitting information forwarded on an downlink transport channel to a radio section between a network and a user equipment, there is a physical downlink shared channel (PDSCH) for transmitting information of DL-SCH, a physical control format indicator channel (PDFICH) for indicating the number of OFDM symbols used for transmitting a physical downlink control channel (PDCCH), a physical HARQ (hybrid automatic repeat request) indicator channel (PHICH) for transmitting HARQ ACK (Acknowledge)/NACK (Non-acknowledge) as response to UL transmission or a PDCCH for transmitting such control information, as DL grant indicating resource allocation for transmitting a Paging Channel (PCH) and DL-SCH, information related to HARQ, UL grant indicating resource allocation for transmitting a UL-SCH and like that. As an uplink physical channel for transmitting information forwarded on an uplink transport channel to a radio section between a network and a user equipment, there is a physical uplink shared channel (PUSCH) for transmitting information of UL-SCH, a physical random access channel (PRACH) for transmitting RACH information or a physical uplink control channel (PUCCH) for transmitting such control information, which is provided by first and second layers, as HARQ ACK/NACK (Non-acknowledge), scheduling request (SR), channel quality indicator (CQI) report and the like.

The NAS state model is based on a two-dimensional model which consists of EPS Mobility Management (EMM) states and of EPS Connection Management (ECM) states. The EMM states describe the mobility management states that result from the mobility management procedures e.g., Attach and Tracking Area Update procedures. The ECM states describe the signaling connectivity between the UE and the EPC.

In detail, in order to manage mobility of a UE in NAS layers positioned in control planes of the UE and an MME, an EPS mobility management REGISTERED (EMM-REGISTERED) state and an EMM-DEREGISTERED state may be defined. The EMM-REGISTERED state and the EMM-DEREGISTERED state may be applied to the UE and the MME.

The UE is in the EMM deregistered state, like a state in which power of the UE is first turned on, and in order for the UE to access a network, a process of registering in the corresponding network is performed through an initial access procedure. When the access procedure is successfully performed, the UE and the MME transition to an EMM-REGISTERED state.

Also, in order to manage signaling connection between the UE and the network, an EPS connection management CONNECTED (ECM-CONNECTED) state and an ECM-IDLE state may be defined. The ECM-CONNECTED state and the ECM-IDLE state may also be applied to the UE and the MME. The ECM connection may include an RRC connection established between the UE and a BS and an S1 signaling connection established between the BS and the MME. The RRC state indicates whether an RRC layer of the UE and an RRC layer of the BS are logically connected. That is, when the RRC layer of the UE and the RRC layer of the BS are connected, the UE may be in an RRC_CONNECTED state. When the RRC layer of the UE and the RRC layer of the BS are not connected, the UE in an RRC_IDLE state.

Here, the ECM and EMM states are independent of each other and when the UE is in EMM-REGISTERED state this does not imply that the user plane (radio and S1 bearers) is established.

In E-UTRAN RRC_CONNECTED state, network-controlled UE-assisted handovers are performed and various DRX cycles are supported. In E-UTRAN RRC_IDLE state, cell reselections are performed and DRX is supported.

The network may recognize the presence of the UE in the ECM-CONNECTED state by the cell and effectively control the UE. That is, when the UE is in the ECM-CONNECTED state, mobility of the UE is managed by a command from the network. In the ECM-CONNECTED state, the network knows about a cell to which the UE belongs. Thus, the network may transmit and/or receive data to or from the UE, control mobility such as handover of the UE, and perform cell measurement on a neighbor cell.

Meanwhile, the network cannot recognize the presence of the UE in the ECM-idle state and a core network (CN) manages the UE by the tracking area, a unit greater than cell. When the UE is in the ECM-idle state, the UE performs discontinuous reception (DRX) set by the NAS using an ID uniquely assigned in a tracking region. That is, the UE may monitor a paging signal at a particular paging opportunity in every UE-specific paging DRX cycle to receive broadcast of system information and paging information. Also, when the UE is in the ECM-idle state, the network does not have context information of the UE.

Thus, the UE in the ECM-idle state may perform a UE-based mobility-related procedure such as cell selection or cell reselection without having to receive a command from the network. When a location of the UE in the ECM-idle state is changed from that known by the network, the UE may inform the network about a location thereof through a tracking area update (TAU) procedure.

As described above, in order for the UE to receive a general mobile communication service such as voice or data, the UE needs to transition to an ECM-CONNECTED state. The UE is in the ECM-IDLE state like the case in which power of the UE is first turned on. When the UE is successfully registered in the corresponding network through an initial attach procedure, the UE and the MME transition to an ECM-CONNECTED state. Also, in a case in which the UE is registered in the network but traffic is deactivated so radio resource is not allocated, the UE is in an ECM-IDLE state, and when uplink or downlink new traffic is generated in the corresponding UE, the UE and the MME transition to an ECM-CONNECTED state through a service request procedure.

FIG. 3 illustrates physical channels and a view showing physical channels used for in the 3GPP LTE/LTE-A system to which the present invention can be applied.

When a UE is powered on or when the UE newly enters a cell, the UE performs an initial cell search operation such as synchronization with a BS in step S301. For the initial cell search operation, the UE may receive a Primary Synchronization Channel (P-SCH) and a Secondary Synchronization Channel (S-SCH) from the BS so as to perform synchronization with the BS, and acquire information such as a cell ID.

Thereafter, the UE may receive a physical broadcast channel (PBCH) from the BS and acquire broadcast information in the cell. Meanwhile, the UE may receive a Downlink Reference signal (DL RS) in the initial cell search step and confirm a downlink channel state.

The UE which completes the initial cell search may receive a Physical Downlink Control Channel (PDCCH) and a Physical Downlink Shared Channel (PDSCH) corresponding to the PDCCH, and acquire more detailed system information in step S302.

Thereafter, the UE may perform a random access procedure in steps S303 to S306, in order to complete the access to the BS. For the random access procedure, the UE may transmit a preamble via a Physical Random Access Channel (PRACH) (S303), and may receive a message in response to the preamble via the PDCCH and the PDSCH corresponding thereto (S304). In contention-based random access, a contention resolution procedure including the transmission of an additional PRACH (S305) and the reception of the PDCCH and the PDSCH corresponding thereto (S306) may be performed.

The UE which performs the above-described procedure may then receive the PDCCH/PDSCH (S307) and transmit a Physical Uplink Shared Channel (PUSCH)/Physical Uplink Control Channel (PUCCH) (S308), as a general uplink/downlink signal transmission procedure.

Control information transmitted from the UE to the BS is collectively referred to as uplink control information (UCI). The UCI includes hybrid automatic repeat and request acknowledgement/negative-acknowledgement (HARQ ACK/NACK), scheduling request (SR), channel quality information (CQI), precoding matrix indicator (PMI), rank indication (RI), etc. In the embodiments of the present invention, CQI and/or PMI are also referred to as channel quality control information.

In general, although a UCI is periodically transmitted via a PUCCH in the LTE system, this may be transmitted through a PUSCH if control information and traffic data are simultaneously transmitted. In addition, a UCI may be aperiodically transmitted via a PUSCH according to a network request/instruction.

FIG. 4 is a diagram showing the structure of a radio frame used in a 3GPP LTE system to which the present invention can be applied.

In a cellular OFDM radio packet communication system, uplink/downlink data packet transmission is performed in subframe units and one subframe is defined as a predetermined duration including a plurality of OFDM symbols. The 3GPP LTE standard supports a type-1 radio frame structure applicable to frequency division duplex (FDD) and a type-2 radio frame structure applicable to time division duplex (TDD). According to the FDD scheme, the UL transmission and the DL transmission are performed by occupying different frequency bandwidths. According to the TDD scheme, the UL transmission and the DL transmission are performed on respective times different from each other while occupying the same frequency bandwidth. The channel response in the TDD scheme is substantially reciprocal. This signifies that the DL channel response and the UL channel response are about the same in a given frequency domain. Accordingly, there is a merit that the DL channel response can be obtained from the UL channel response in wireless communication systems based on the TDD. In the TDD scheme, since entire frequency bandwidth is timely divided in the UL transmission and the DL transmission, the DL transmission by an eNB and the UL transmission by a UE may not be performed simultaneously. In the TDD system in which the UL transmission and the DL transmission are distinguished by a unit of subframe, the UL transmission and the DL transmission are performed in different subframes.

FIG. 4(a) shows the structure of the type-1 radio frame. A downlink radio frame includes 10 subframes and one subframe includes two slots in a time domain. A time required to transmit one subframe is referred to as a transmission time interval (TTI). For example, one subframe has a length of 1 ms and one slot has a length of 0.5 ms. One slot includes a plurality of OFDM symbols in a time domain and includes a plurality of resource blocks (RBs) in a frequency domain. In the 3GPP LTE system, since OFDMA is used in the downlink, an OFDM symbol indicates one symbol period. The OFDM symbol may be referred to as an SC-FDMA symbol or symbol period. A RB as a resource allocation unit may include a plurality of consecutive subcarriers in one slot.

The number of OFDM symbols included in one slot may be changed according to the configuration of cyclic prefix (CP). CP includes an extended CP and a normal CP. For example, if OFDM symbols are configured by the normal CP, the number of OFDM symbols included in one slot may be 7. If OFDM symbols are configured by the extended CP, since the length of one OFDM symbol is increased, the number of OFDM symbols included in one slot is less than the number of OFDM symbols in case of the normal CP. In case of the extended CP, for example, the number of OFDM symbols included in one slot may be 6. In the case where a channel state is unstable, such as the case where a UE moves at a high speed, the extended CP may be used in order to further reduce inter-symbol interference.

In case of using the normal CP, since one slot includes seven OFDM symbols, one subframe includes 14 OFDM symbols. At this time, a maximum of three first OFDM symbols of each subframe may be allocated to a physical downlink control channel (PDCCH) and the remaining OFDM symbols may be allocated to a physical downlink shared channel (PDSCH).

FIG. 4(b) shows the structure of the type-2 radio frame. The type-2 radio frame includes two half frames and each half frame includes five subframes, a downlink pilot time slot (DwPTS), a guard period (GP) and an uplink pilot time slot (UpPTS). From among these, one subframe includes two slots. The DwPTS is used for initial cell search, synchronization or channel estimation of a UE. The UpPTS is used for channel estimation of a BS and uplink transmission synchronization of a UE. The GP is used to eliminate interference generated in the uplink due to multi-path latency of a downlink signal between the uplink and the downlink.

The structure of the radio frame is only exemplary and the number of subframes included in the radio frame, the number of slots included in the subframe, or the number of symbols included in the slot may be variously changed.

FIG. 5 shows an example of a resource grid for one downlink slot in the wireless communication system to which the present invention can be applied.

Referring to the FIG. 5, the downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block includes 12×7 resource elements. The resource element on the resource grid may be identified by an index pair (k, l) in the slot. Here, k (k=0, NRB×12−1) denotes an index of subcarrier in the frequency domain, and l (l=0, . . . , 6) denotes an index of symbol in the time domain. The number NDL of resource blocks included in the downlink slot depends on a downlink transmission bandwidth determined in a cell.

FIG. 6 shows a structure of a downlink subframe in the wireless communication system to which the present invention can be applied.

Referring to the FIG. 6, a maximum of three OFDM symbols located in a front portion of a first slot in a subframe correspond to a control region to be assigned with control channels. The remaining OFDM symbols correspond to a data region to be assigned with physical downlink shared channels (PDSCHs).

Examples of downlink control channels used in the 3GPP LTE include a physical control format indicator channel (PCFICH), a physical downlink control channel (PDCCH), a physical hybrid-ARQ indicator channel (PHICH), etc. The PCFICH transmitted in a 1st OFDM symbol of a subframe carries information regarding the number of OFDM symbols (i.e., a size of a control region) used for transmission of control channels in the subframe. Control information transmitted over the PDCCH is referred to as downlink control information (DCI). The DCI transmits uplink resource assignment information, downlink resource assignment information, an uplink transmit power control (TPC) command for any UE groups, etc. The PHICH carries an acknowledgement (ACK)/not-acknowledgement (NACK) signal for an uplink hybrid automatic repeat request (HARQ). That is, the ACK/NACK signal for uplink data transmitted by a UE is transmitted over the PHICH.

ABS determines a PDCCH format according to DCI to be transmitted to a UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indication identifier (e.g., paging-RNTI (P-RNTI)) may be masked to the CRC. If the PDCCH is for system information, a system information identifier (e.g., system information-RNTI (SI-RNTI)) may be masked to the CRC. To indicate a random access response that is a response for transmission of a random access preamble of the UE, a random access-RNTI (RA-RNTI) may be masked to the CRC.

FIG. 7 shows a structure of an uplink subframe in the wireless communication system to which the present invention can be applied.

Referring to the FIG. 7, the uplink subframe can be divided in a frequency domain into a control region and a data region. The control region is allocated with a physical uplink control channel (PUCCH) for carrying uplink control information. The data region is allocated with a physical uplink shared channel (PUSCH) for carrying user data. In case of being indicated from higher layer, UE can simultaneously transmit the PUCCH and the PUSCH.

The PUCCH for one UE is allocated to an RB pair in a subframe. RBs belonging to the RB pair occupy different subcarriers in respective two slots. This is called that the RB pair allocated to the PUCCH is frequency-hopped in a slot boundary.

Physical Downlink Control Channel (PDCCH)

The control information transmitted through the PDCCH is referred to as a downlink control indicator (DCI). In the PDCCH, a size and use of the control information are different according to a DCI format. In addition, a size of the control information may be changed according to a coding rate.

Table 1 represents the DCI according to the DCI format.

TABLE 1

| DCI format | Objectives |
| --- | --- |
| 0 | Scheduling of PUSCH |
| 1 | Scheduling of one PDSCH codeword |
| 1A | Compact scheduling of one PDSCH codeword |
| 1B | Closed-loop single-rank transmission |

TABLE 1-continued

| DCI format | Objectives |
| --- | --- |
| 1C | Paging, RACH response and dynamic BCCH |
| 1D | MU-MIMO |
| 2 | Scheduling of rank-adapted closed-loop spatial multiplexing mode |
| 2A | Scheduling of rank-adapted open-loop spatial multiplexing mode |
| 3 | TPC commands for PUCCH and PUSCH with 2 bit power adjustments |
| 3A | TPC commands for PUCCH and PUSCH with single bit power adjustments |
| 4 | the scheduling of PUSCH in one UL cell with multi-antenna port transmission mode |

Referring to Table 1, the DCI format includes format 0 for the PUSCH scheduling, format 1 for scheduling of one PDSCH codeword, format 1A for compact scheduling of one PDSCH codeword, format 1C for very compact scheduling of the DL-SCH, format 2 for PDSCH scheduling in a closed-loop spatial multiplexing mode, format 2A for PDSCH scheduling in an open-loop spatial multiplexing mode, formats 3 and 3A for transmitting a transmission power control (TPC) command for a UL channel, and format 4 for PUSCH scheduling within one UL cell in a multiple antenna port transmission mode.

The DCI format 1A may be used for PDSCH scheduling whichever transmission mode is configured to a UE.

Such DCI formats may be independently applied to each UE, and the PDCCHs of several UEs may be simultaneously multiplexed in one subframe. The PDCCH is comprised of an aggregation of one or a few continuous control channel elements (CCEs). The CCE is a logical allocation unit used for providing a coding rate according to a state of radio channel to the PDCCH. The CCE is referred to as a unit that corresponds to nine sets of resource element group (REG) which is comprised of four resource elements. An eNB may use $\{1, 2, 4, 8\}$ CCEs for constructing one PDCCH signal, and this $\{1, 2, 4, 8\}$ is called a CCE aggregation level. The number of CCE used for transmitting a specific PDCCH is determined by the eNB according to the channel state. The PDCCH configured according to each UE is mapped with being interleaved to a control channel region of each subframe by a CCE-to-RE mapping rule. A location of the PDCCH may be changed according to the number of OFDM symbols for the control channel, the number of PHICH group, a transmission antenna, a frequency shift, etc.

As described above, a channel coding is independently performed for the PDCCH of each multiplexed UE, and the cyclic redundancy check (CRC) is applied. By masking each UE ID to CRC, the UE may receive its PDCCH. However, in the control region allocated in a subframe, the eNB does not provide information on where the PDCCH that corresponds to the UE is. Since the UE is unable to know on which position its PDCCH is transmitted with which CCE aggregation level and DCI format in order to receive the control channel transmitted from the eNB, the UE finds its own PDCCH by monitoring a set of PDCCH candidates in a subframe. This is called a blind decoding (BD). The blind decoding may also be called a blind detection or a blind search. The blind decoding signifies a method of verifying whether the corresponding PDCCH is its control channel by checking CRC errors, after the UE de-masks its UE ID in CRC part.

Buffer Status Reporting (BSR)

FIG. 8 illustrates the MAC PDU used in the MAC entity in the wireless communication system to which the present invention can be applied.

Referring to FIG. 8, the MAC PDU includes a MAC header, at least one MAC service data unit (SDU) and at least one control element, additionally may include padding. In some cases, at least one of the MAC SDUs and the MAC control elements may not be included in the MAC PDU.

As an example of FIG. 8, it is common that the MAC control elements are located ahead of the MAC SDUs. And the size of MAC control elements may be fixed or changeable. In case that the size of MAC control elements is changeable, it may be determined through an extended bit whether the size of MAC control elements is extended. The size of MAC SDU may be also variable.

The MAC header may include at least one sub-header. In this time, at least one sub-header that is included in the MAC header is respectively corresponding to the MAC SDUs, the MAC control elements and the padding, and the order of the sub-header is same as the arrangement order of the corresponding elements. For example, as an example of FIG. 8, if there are included MAC control element 1, MAC control element 2, a plurality of MAC SDUs and padding in the MAC PDU, in the MAC header, the following may be arranged in order as a sub-header corresponding to the MAC control element 1, a sub-header corresponding to the MAC control element 2, a plurality of sub-headers corresponding to a plurality of MAC SDUs respectively and a sub-header corresponding to the padding.

Sub-headers included in the MAC header, as an example of FIG. 8, six header fields may be included. Particularly, the sub-header may include six header fields of R/R/E/LCID/F/L.

For the sub-header corresponding to the very last one among the sub-header corresponding to the MAC control element of fixed size and data fields included in the MAC PDU, as an example illustrated in FIG. 8, the sub-header that is included four header fields may be used. In case that the sub-header includes four fields like this, the four fields may be R/R/E/LCID.

FIG. 9 and FIG. 10 illustrate the sub-header of the MAC PDU in the wireless communication system to which the present invention can be applied.

Each field is described as below with reference to FIG. 9 and FIG. 10.

1) R: Reserved bit, which is not used.

2) E: Extended field, which represents whether the elements corresponding to the sub-header are extended. For example, in case that E field is '0', the element corresponding to the sub-header is terminated without any repeat, and in case that E field is '1', the element corresponding to the sub-header is repeated once more and may be extended by twice in the length.

LCID: Logical channel identification field identifies a logical channel corresponding to the relevant MAC SDU or identifies a type of the relevant MAC control element and padding. If the MAC SDU is associated with the sub-header, it may show which logical channel the MAC SDU is corresponding to, and if the MAC control element is associated with the sub-header, it may show what the MAC control element is.

Table 2 represents the value of LCID for the DL-SCH

TABLE 2

| Index | LCID values |
| --- | --- |
| 00000 | CCCH |
| 00001-01010 | Identity of the logical channel |
| 01011-11001 | Reserved |

TABLE 2-continued

| Index | LCID values |
| --- | --- |
| 11010 | Long DRX Command |
| 11011 | Activation/Deactivation |
| 11100 | UE Contention Resolution Identity |
| 11101 | Timing Advance Command |
| 11110 | DRX Command |
| 11111 | Padding |

Table 3 represents the value of LCID for the UL-SCH

TABLE 3

| Index | LCID values |
| --- | --- |
| 00000 | CCCH |
| 00001-01010 | Identity of the logical channel |
| 01011-11000 | Reserved |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

In LTE/LTE-A system, the UE may report the buffer state of its own to the network by configuring one of the index value among truncated BSR, short BSR, and long BSR in the LCID field.

The relationship of mapping between the index and the LCID value illustrated in Table 2 and Table 3 is exemplified for the convenience of the descriptions, but the present invention is not limited thereto.

4) F: Format field, which represents the size of L field.

5) L: Length field, which represents the size of MAC SDU and MAC control element corresponding to the sub-header. If the size of MAC SDU or MAC control element corresponding to the sub-header is equal to or less than 127 bits, the 7-bit L field is used (FIG. 9 (a)), otherwise, the 15-bit L field may be used (FIG. 9 (b)). In case that the size of MAC control element is changeable, the size of MAC control element may be defined by the L field. In case that the size of MAC control element is fixed, the size of MAC control element may be determined without the size of MAC control element being defined by the L field, accordingly the F and L field may be omitted as shown in FIG. 10.

FIG. 11 illustrates formats of the MAC control elements in order to report the buffer state in the wireless communication system to which the present invention can be applied.

In case of the truncated BSR and short BSR being defined in the LCID field of sub-header, the MAC control element corresponding to the sub-header, as shown in FIG. 11 (a), may be configured to include one logical channel group identification (LCG ID) field and one buffer size field indicating the buffer state of the LCG. The LCG ID field is for identifying the logical channel group that is required to report the buffer state, which may have the size of 2 bits.

The buffer size field is used for identifying the total amount of available data from the all logical channels that are included in the LCG. The available data includes all the data that are going to be transmitted from the RLC layer and the PDCP layer, and the amount of data is represented in byte. In this time, the size of RLC header and MAC header may be excluded when calculating the amount of data. The buffer size field may be 6 bits.

In case of the extended BSR being defined in the LCID field of sub-header, the MAC control element corresponding to the sub-header, as shown in FIG. 11 (b), may include four buffer size fields indicating the buffer state of four groups having 0 to 3 LCG IDs. Each of the buffer size fields may be used for identifying the total amount of available data from different logical channel groups.

Uplink Resource Allocation Procedure

In 3GPP LTE/LTE-A system, in order to maximize resource utilization, the data transmission and reception method based on scheduling of an eNB is used. This signifies that if there are data to transmit by a UE, the UL resource allocation is preferentially requested to the eNB, and the data may be transmitted using only UL resources allocated by the eNB.

FIG. 12 illustrates a UL resource allocation procedure of a UE in the wireless communication system to which the present application can be applied.

For effective utilization of the UL radio resources, an eNB should know which sorts and what amount of data to be transmitted to the UL for each UE. Accordingly, the UE itself may forward the information of UL data to transmit, and the eNB may allocate the UL resources to the corresponding UE based on this. In this case, the information of the UL data that the UE forwards to the eNB is the quality of UL data stored in its buffer, and this is referred to as a buffer status report (BSR). The BSR is transmitted using a MAC control element in case that the resources on the PUSCH in current TTI are allocated to the UE and the reporting event is triggered.

FIG. 12(a) exemplifies a UL resource allocation procedure for actual data in case that the UL radio resources for the buffer status reporting (BSR) are not allocated to a UE. That is, for a UE that switches a state of active mode in the DRX mode, since there is no data resource allocated beforehand, the resource for UL data should be requested starting from the SR transmission through the PUCCH, in this case, the UL resource allocation procedure of 5 steps is used.

Referring to FIG. 12(a), the case that the PUSCH resource for transmitting the BSR is not allocated to a UE is illustrated, and the UE transmits the scheduling request (SR) to an eNB first in order to be allocated with the PUSCH resources (step, S1201).

The scheduling request (SR) is used to request in order for the UE to be allocated with the PUSCH resource for UL transmission in case that the reporting event is occurred but the radio resource is not scheduled on the PUSCH in current TTI. That is, the UE transmits the SR on the PUCCH when the regular BSR is triggered but does not have the UL radio resource for transmitting the BSR to the eNB. The UE transmits the SR through the PUCCH or starts the random access procedure according to whether the PUCCH resources for the SR are configured. In particular, the PUCCH resources in which the SR can be transmitted may be determined as a combination of the PRB through which the SR is transmitted, the cyclic shift (CS) applied to a basic sequence (e.g., ZC sequence) for spread in frequency domain of the SR and an orthogonal code (OC) for spread in time domain of the SR. Additionally, the SR periodicity and the SR subframe offset information may be included. The PUCCH resources through which the SR can be transmitted may be configured by a higher layer (e.g., the RRC layer) in UE-specific manner.

When a UE receives the UL grant for the PUSCH resources for BSR transmission from an eNB (step, S1203), the UE transmits the triggered BSR through the PUSCH resources which are allocated by the UL grant (step, S1205).

The eNB verifies the quality of data that the UE actually transmit to the UL through the BSR, and transmits the UL grant for the PUSCH resources for actual data transmission to the UE (step, S1207). The UE that receives the UL grant for actual data transmission transmits the actual UL data to the eNB through the PUSCH resources (step, S1209).

FIG. 12(b) exemplifies the UL resource allocation procedure for actual data in case that the UL radio resources for the BSR are allocated to a UE.

Referring to FIG. 12(b), the case that the PUSCH resources for BRS transmission are already allocated to a UE is illustrated. In the case, the UE transmits the BSR through the allocated PUSCH resources, and transmits a scheduling request to an eNB (step, S1211). Subsequently, the eNB verifies the quality of data to be transmitted to the UL by the UE through the BSR, and transmits the UL grant for the PUSCH resources for actual data transmission to the UE (step, S1213). The UE that receives the UL grant for actual data transmission transmits the actual UL data to the eNB through the allocated PUSCH resources (step, S1215).

FIG. 13 is a diagram for describing a latency in C-plane required in 3GPP LTE-A to which the present invention can be applied.

Referring to FIG. 13, 3GPP LTE-A requests a transition time from an idle mode (a state that IP address is allocated) to a connected mode to be less than 50 ms. In this time, the transition time includes a configuration time (except latency for transmitting S1) in a user plane (U-plane). In addition, a transition time from a dormant state to an active state in the connection mode is requested to be less than 10 ms.

The transition from the dormant state to the active state may occur in 4 scenarios as follows.

Uplink initiated transition, synchronized
Uplink initiated transition, unsynchronized
Downlink initiated transition, synchronized
Downlink initiated transition, unsynchronized
Random Access Channel (RACH) Procedure FIGS. 14a and 14b illustrate one example of a random access procedure in the LTE system.

The random access procedure is carried out during initial connection in the RRC_IDLE state, initial connection after radio link failure, handover which requires the random access procedure, and upon occurrence of uplink or downlink data requiring the random access procedure while in the RRC_CONNECTED state. Part of the RRC message such as the RRC connection request message, cell update message, and UTRAN registration area (URA) update message is also transmitted through the random access procedure. Logical channels such as a common control channel (CCCH), dedicated control channel (DCCH), and dedicated traffic channel (DTCH) can be mapped to a physical channel, random access channel (RACH). The RACH is mapped to a physical channel, physical random access channel (PRACH).

If the MAC layer of the UE commands the UE's physical layer to perform PRACH transmission, the UE's physical layer first selects one access slot and one signature and transmits a PRACH preamble through uplink transmission. The random access procedure is divided into a contention-based random access procedure and a non-contention based random access procedure.

FIG. 14a illustrates one example of a contention-based random access procedure, and FIG. 14b illustrates one example of a non-contention based random access procedure.

First, the contention-based random access procedure will be described with reference to FIG. 14a.

The UE receives information about random access from the eNB through system information and stores the received information. Afterwards, in case random access is needed, the UE transmits a random access preamble (which is also called a message 1) to the eNB S1401.

If the eNB receives a random access preamble from the UE, the eNB transmits a random access response message (which is also called a message 2) to the UE S1402. More specifically, downlink scheduling information about the random access response message, being CRC-masked with a random access-ratio network temporary identifier (RA-RNTI), can be transmitted on an L1 or L2 control channel (PDCCH). The UE, which has received a downlink scheduling signal masked with an RA-RNTI, can receive the random access response message from a physical downlink shared channel (PDSCH) and decode the received message. Afterwards, the UE checks the random access response message as to whether random access response information for the UE exists.

The UE can determine existence of random access response information by checking existence of a random access preamble ID (RAID) with respect to the preamble that the UE has transmitted.

The random access response information includes timing alignment (TA) indicating timing offset information for synchronization, radio resource allocation information used for uplink transmission, and a temporary C-RNTI for identifying UEs.

If receiving random access response information, the UE carries out uplink transmission (which is also called a message 3) to an uplink shared channel (UL-SCH) according to radio resource allocation information included in the response information S1403. At this time, uplink transmission may be described as scheduled transmission.

After receiving the uplink transmission from the UE, the eNB transmits a message for contention resolution (which is also called a message 4) to the UE through a downlink shared channel (DL-SCH) S1404.

Next, a non-contention based random access procedure will be described with reference to FIG. 14b.

Before the UE transmits a random access preamble, the eNB allocates a non-contention random access preamble to the UE S1411.

The non-contention random access preamble can be allocated through a handover command or dedicated signaling such as signaling through the PDCCH. In case non-contention random access preamble is allocated to the UE, the UE transmits the allocated non-contention random access preamble to the eNB S1412.

Afterwards, similarly to the S1402 step of the contention-based random access procedure, the UE can transmit a random access response (which is also called a message 2) to the UE S1413.

Although the HARQ is not applied for a random access response during the random access procedure described above, the HARQ can be applied for uplink transmission with respect to a random access response or a message for contention resolution. Therefore, the UE doesn't have to transmit ACK or NACK signal for the case of the random access response.

Physical Uplink Control Channel (PUCCH)

Uplink control information (UCI) transmitted through a PUCCH may include a scheduling request (SR), HARQ ACK/NACK information and downlink channel measurement information.

The HARQ ACK/NACK information may be generated depending on whether a downlink data packet on a PDSCH has been successfully decoded or not. In an existing wireless communication system, 1 bit is transmitted as ACK/NACK information with respect to the transmission of downlink single codeword, and 2 bits are transmitted as ACK/NACK information with respect to the transmission of downlink 2 codewords.

The channel measurement information refers to feedback information related to a multiple input multiple output (MIMO) scheme, and may include a channel quality indicator (CQI), a precoding matrix index (PMI) and a rank indicator (RI). Pieces of these channel measurement information may be collectively expressed as a CQI.

For the transmission of a CQI, 20 bits may be used per subframe.

A PUCCH may be modulated using binary phase shift keying (BPSK) scheme and a quadrature phase shift keying (QPSK) scheme. Control information of a plurality of UEs may be transmitted through a PUCCH. If code division multiplexing (CDM) is performed to distinguish the signals of UEs, a constant amplitude zero autocorrelation (CAZAC) sequence of a length 12 is chiefly used. The CAZAC sequence has a characteristic in that it maintains constant amplitude in a time domain and a frequency domain, and thus has a property suitable for increasing coverage by lowering the peak-to-average power ratio (PAPR) or cubic metric (CM) of a UE. Furthermore, ACK/NACK information for downlink data transmission transmitted through a PUCCH is covered using orthogonal sequence or orthogonal cover (OC).

Furthermore, control information transmitted on a PUCCH may be distinguished using a cyclically shifted sequence having a different cyclic shift (CS) value. The cyclically shifted sequence may be generated by cyclically shifting a base sequence by a specific CS amount. The specific CS amount is indicated by a CS index. The number of available cyclic shifts may be different depending on the latency spread of a channel. A variety of types of sequences may be used as the base sequence, and the aforementioned CAZAC sequence is an example thereof.

Furthermore, the amount of control information which may be transmitted by a UE in one subframe may be determined depending on the number of SC-FDMA symbols which may be used to send control information (i.e., SC-FDMA symbols other than an SC-FDMA symbol used in the transmission of a reference signal (RS) for the coherent detection of a PUCCH.

In the 3GPP LTE system, a PUCCH is defined as a total of different formats depending on transmitted control information, a modulation scheme and the amount of control information. The attributes of uplink control information (UCI) transmitted may be summarized as in Table 4 below depending on each PUCCH format.

TABLE 4

| PUCCH Format | Uplink Control Information(UCI) |
| --- | --- |
| Format 1 | Scheduling Request (SR) (unmodulated waveform) |
| Format 1a | 1-bit HARQ ACK/NACK with/without SR |
| Format 1b | 2-bit HARQ ACK/NACK with/without SR |
| Format 2 | CQI (20 coded bits) |
| Format 2 | CQI and 1- or 2-bit HARQ ACK/NACK (20 bits) for extended CP only |
| Format 2a | CQI and 1-bit HARQ ACK/NACK (20 + 1 coded bits) |
| Format 2b | CQI and 2-bit HARQ ACK/NACK (20 + 2 coded bits) |

The PUCCH format 1 is used for the sole transmission of an SR. In the case of the SR sole transmission, a non-modulated waveform is applied, which is described in detail later.

The PUCCH format 1a or 1b is used for the transmission of HARQ ACK/NACK. If HARQ ACK/NACK is solely transmitted in a specific subframe, the PUCCH format 1a or 1b may be used. Alternatively, HARQ ACK/NACK and an SR may be transmitted in the same subframe using the PUCCH format 1a or 1b.

The PUCCH format 2 is used for the transmission of a CQI, and the PUCCH format 2a or 2b is used for the transmission of a CQI and HARQ ACK/NACK.

In the case of an extended CP, the PUCCH format 2 may be used for the transmission of a CQI and HARQ ACK/NACK.

FIG. 15 shows an example of a form in which the PUCCH formats are mapped to PUCCH regions in a wireless communication system to which an embodiment of the present invention may be applied.

In FIG. 15, $N_{RB}^{UL}$ indicates the number of resource blocks in uplink, and $0, 1, \ldots, N_{RB}^{UL}-1$ mean the numbers of physical resource blocks. Basically, a PUCCH is mapped to the edges of an uplink frequency block on both sides thereof. As shown in FIG. 15, the PUCCH formats 2/2a/2b are mapped to a PUCCH region indicated by m=0, 1. It may be represented that the PUCCH formats 2/2a/2b are mapped to resource blocks located at a band edge. Furthermore, both the PUCCH formats 2/2a/2b and the PUCCH formats 1/1a/1b may be mixed and mapped to a PUCCH region indicated by m=2. The PUCCH formats 1/1a/1b may be mapped to PUCCH regions indicated by m=3, 4, 5. The number of PUCCH RBs $N_{RB}^{(2)}$ available for the PUCCH formats 2/2a/2b may be indicated for UEs within a cell through broadcasting signaling.

The PUCCH formats 2/2a/2b are described. The PUCCH formats 2/2a/2b are control channels for transmitting channel measurement feedback (i.e., a CQI, a PMI and an RI).

The report cycle of channel measurement feedback (hereinafter collectively referred to as "CQI information") and a frequency unit (or frequency resolution), that is, the subject of measurement, may be controlled by an eNB. In the time domain, a periodic CQI report and an aperiodic CQI report may be supported. The PUCCH format 2 may be used for only a periodic report, and a PUSCH may be used for an aperiodic report. In the case of the aperiodic report, an eNB may instruct a UE to carry an individual CQI report on resources scheduled for the transmission of UL data and to send the CQI.

FIG. 16 shows the structure of a CQI channel in the case of a common CP in a wireless communication system to which an embodiment of the present invention may be applied.

The SC-FDMA symbols 1 and 5 (the second and the sixth symbols) of the SC-FDMA symbols 0 to 6 of one slot may be used for the transmission of a demodulation reference signal (DMRS), and CQI information may be transmitted in the remaining SC-FDMA symbols. In the case of, an extended CP, one SC-FDMA symbol (e.g., the SC-FDMA symbol 3) is used for the transmission of a DMRS. In the PUCCH formats 2/2a/2b, modulation according to the CAZAC sequence is supported, and the CAZAC sequence of a length 12 is multiplied by a QPSK-modulated symbol. A cyclic shift (CS) of a sequence is changed between a symbol and a slot. Orthogonal covering is used for a DMRS.

A reference signal (DMRS) is carried on two SC-FDMA symbols that belong to seven SC-FDMA symbols included in one slot and that are spaced apart by three SC-FDMA symbols. CQI information is carried on the remaining five SC-FDMA symbols. Two RSs are used within one slot in order to support a high-speed UE. Furthermore, UEs are distinguished from each other using a cyclic shift (CS) sequence. CQI information symbols are modulated and transferred over all of SC-FDMA symbols. The SC-FDMA symbol has one sequence. That is, a UE modulates a CQI according to each sequence and transmits the CQI.

The number of symbols which may be transmitted in one TTI is 10. The modulation of CQI information has been determined up to QPSK. If QPSK mapping is used for an SC-FDMA symbol, a CQI value of 10 bits may be carried on one slot because a CQI value of 2 bits is carried on the SC-FDMA symbol. Accordingly, a CQI value of a maximum of 20 bits may be carried on one subframe. A frequency domain spread symbol is used to spread CQI information in the frequency domain.

A CAZAC sequence (e.g., ZC sequence) of a length 12 may be used as a frequency domain spread symbol. Control channels may be distinguished from each other by applying CAZAC sequences having different cyclic shift values. IFFT is performed on CQI information on which frequency domain spreading has been performed.

12 different UEs may be orthogonally multiplexed on the same PUCCH RB by 12 cyclic shifts having the same interval. In the case of a common CP, a DMRS sequence on the SC-FDMA symbols 1 and 5 (on the SC-FDMA symbol in the case of an extended CP) is similar to a CQI signal sequence on the frequency domain, but modulation, such as CQI information, is not applied to the DMRS sequence.

A UE may be semi-statically configured by higher layer signaling so that it periodically reports different CQI, PMI and RI types on PUCCH resources indicated by PUCCH resources indices $n_{PUCCH}^{(1,\tilde{p})}$, $n_{PUCCH}^{(2,\tilde{p})}$ and $n_{PUCCH}^{(3,\tilde{p})}$. In this case, the PUCCH resources index $n_{PUCCH}^{(2,\tilde{p})}$ is information indicative of a PUCCH region used for the transmission of the PUCCH formats 2/2a/2b and the value of a cyclic shift (CS) to be used.

PUCCH Channel Structure

The PUCCH formats 1a and 1 b are described.

In the PUCCH formats 1a/1b, a symbol modulated using the BPSK or QPSK modulation scheme is multiplied by a CAZAC sequence of a length 12. For example, the results of the multiplication of a modulation symbol d(0) by a CAZAC sequence r(n) (n=0, 1, 2, . . . , N−1) of a length N are y(0), y(1), y(2), . . . , y(N−1). y(0), . . . , y(N−1) symbols may be called a block of symbols. After a modulation symbol is multiplied by a CAZAC sequence, block-wise spreading using an orthogonal sequence is applied.

A Hadamard sequence of a length 4 is used for common ACK/NACK information, and a discrete Fourier transform (DFT) sequence of a length 3 is used for shortened CK/NACK information and a reference signal.

A Hadamard sequence of a length 2 is used for a reference signal in the case of an extended CP.

FIG. 17 shows the structure of an ACK/NACK channel in the case of a common CP in a wireless communication system to which an embodiment of the present invention may be applied.

FIG. 17 illustrates the structure of a PUCCH channel for the transmission of HARQ ACK/NACK without a CQI.

A reference signal (RS) is carried on three contiguous SC-FDMA symbols that belong to seven SC-FDMA symbols included in one slot and that are located in the middle part, and an ACK/NACK signal is carried on the remaining four SC-FDMA symbols.

In the case of an extended CP, an RS may be carried on two contiguous symbols in the middle. The number and location of symbols used for an RS may be different depending on a control channel. The number and location of symbols used for an ACK/NACK signal associated with the RS may also be changed depending on the RS.

Pieces of acknowledgement information (an unscrambled state) of 1 bit and 2 bits may be expressed as one HARQ ACK/NACK modulation symbol using the BPSK and QPSK modulation schemes, respectively. Positive acknowledgement (ACK) may be encoded into "1", and negative acknowledgement (NACK) may be encoded into "0."

2-dimensional spreading is applied in order to improve a multiplexing capacity when a control signal is transmitted within an allocated band. That is, in order to increase the number of UEs or the number of control channels that may be multiplexed, frequency domain spreads and time domain spreads are applied at the same time.

In order to spread an ACK/NACK signal in the frequency domain, a frequency domain sequence is used as a base sequence. A Zadoff-Chu (ZC) sequence, that is, one of CAZAC sequences, may be used as a frequency domain sequence. For example, the multiplexing of different UEs or different control channels may be applied by applying a different cyclic shift (CS) to a ZC sequence, that is, a base sequence. The number of CS resources supported in an SC-FDMA symbol for PUCCH RBs for the transmission of HARQ ACK/NACK is set by a cell-specific higher layer signaling parameter $\Delta_{shift}^{PUCCH}$.

An ACK/NACK signal on which frequency domain spreading has been performed is spread in the time domain using orthogonal spreading code. A Walsh-Hadamard sequence or DFT sequence may be used as the orthogonal spreading code. For example, an ACK/NACK signal may be spread using orthogonal sequences w0, w1, w2 and w3 of a length 4 with respect to four symbols. Furthermore, an RS is also spread through an orthogonal sequence of a length 3 or a length 2. This is called orthogonal covering (OC).

A plurality of UEs may be multiplexed according to a code division multiplexing (CDM) method using the aforementioned CS resources in the frequency domain and the aforementioned OC resources in the time domain. That is, the ACK/NACK information and RSs of a large number of UEs on the same PUCCH RB may be multiplexed.

With respect to such time domain spreading CDM, the number of spreading codes supported with respect to ACK/NACK information is limited by the number of RS symbols. That is, since the number of RS transmission SC-FDMA symbols is smaller than that of ACK/NACK information transmission SC-FDMA symbols, the multiplexing capacity of an RS is smaller than that of ACK/NACK information.

For example, in the case of a common CP, ACK/NACK information may be transmitted in four symbols. Three orthogonal spreading codes not four orthogonal spreading codes are used for ACK/NACK information. The reason for this is that since the number of RS transmission symbols is limited to three, only the three orthogonal spreading codes may be used for an RS.

In the case where three symbols are used to send an RS and four symbols are used to send ACK/NACK information in one slot of a subframe of a common CP, for example, if six CSs can be used in the frequency domain and three orthogonal cover (OC) resources can be used in the time domain, HARQ acknowledgement from a total of 18 different UEs may be multiplexed within one PUCCH RB. In the case where two symbols are used to send an RS and four symbols are used to send ACK/NACK information in one slot of a subframe of an extended CP, for example, if six CSs can be used in the frequency domain and two orthogonal cover (OC) resources can be used in the time domain, HARQ acknowledgement from a total of 12 different UEs may be multiplexed within one PUCCH RB.

The PUCCH format 1 is described below. A scheduling request (SR) is transmitted in such a manner that a UE requests scheduling or does not scheduling. An SR channel reuses the ACK/NACK channel structure in the PUCCH formats 1a/1b and is configured according to an on-off keying (OOK) method based on the ACK/NACK channel design. A reference signal is not transmitted in the SR channel. Accordingly, a sequence of a length 7 is used in the case of a common CP, and a sequence of a length 6 is used in the case of an extended CP. Different cyclic shifts or orthogonal covers may be allocated to an SR and ACK/NACK. That is, for positive SR transmission, a UE transmits HARQ ACK/NACK through resources allocated for the SR. For negative SR transmission, a UE transmits HARQ ACK/NACK through resources allocated for ACK/NACK.

An enhanced-PUCCH (e-PUCCH) format is described below. The e-PUCCH may correspond to the PUCCH format 3 of the LTE-A system. A block spreading scheme may be applied to ACK/NACK transmission using the PUCCH format 3.

The block spreading scheme is a method of modulating the transmission of a control signal using the SC-FDMA method unlike the existing PUCCH format 1 series or 2 series. As shown in FIG. 8, a symbol sequence may be spread on the time domain using orthogonal cover code (OCC) and transmitted. The control signals of a plurality of UEs may be multiplexed on the same RB using the OCC. In the case of the aforementioned PUCCH format 2, one symbol sequence is transmitted in the time domain and the control signals of a plurality of UEs are multiplexed using the cyclic shift (CS) of a CAZAC sequence. In contrast, in the case of a block spreading-based PUCCH format (e.g., the PUCCH format 3), one symbol sequence is transmitted in the frequency domain and the control signals of a plurality of UEs are multiplexed using time domain spreading using the OCC.

FIG. 18 shows an example in which five SC-FDMA symbols are generated and transmitted for one slot in a wireless communication system to which an embodiment of the present invention may be applied.

FIG. 18 shows an example in which five SC-FDMA symbols (i.e., a data part) are generated using the OCC of a length=5 (or SF=5) in one symbol sequence for one slot. In this case, two RS symbols may be used for one slot.

In the example of FIG. 18, an RS symbol may be generated from a CAZAC sequence to which a specific cyclic shift value has been applied, and may be transmitted over a plurality of RS symbols in such a manner that a specific OCC has been applied (or multiplied). Furthermore, in the example of FIG. 18, assuming that 12 modulation symbols are used for each OFDM symbol (or SC-FDMA symbol) and each modulation symbol is generated by QPSK, a maximum number of bits which may be transmitted in one slot is 12×2=24 bits. Accordingly, the number of bits which may be transmitted in two slots is a total of 48 bits. If the PUCCH channel structure of the block spreading method is used as described above, control information having an extended size can be transmitted compared to the existing PUCCH format 1 series and 2 series.

Physical HARQ Indication Channel (PHICH)

A PHICH is described below.

In the LTE system, since SU-MIMO is not supported in uplink, one PHICH transmits only the PUSCH of one UE, that is, 1-bit ACK/NACK for a single stream.

The 1-bit ACK/NACK is coded into three bits using a repetition code whose code rate is 1/3. Three modulation symbols are generated by modulating the coded ACK/NACK according to a binary phase key-shifting (BPSK) method. The modulation symbol is spread using a spreading factor (SF)=4 in a normal CP structure and using SF=2 in an extended CP structure.

When the modulation symbols are spread, an orthogonal sequence is used. The number of orthogonal sequences used becomes SF*2 in order to apply I/Q multiplexing.

PHICHs spread using the SF*2 orthogonal sequence may be defined as one PHICH group. Layer mapping is performed on the spread symbols. The layer-mapped symbols are subjected to resource mapping and transmitted.

A PHICH transmits HARQ ACK/NACK according to PUSCH transmission. A plurality of PHICHs mapped to the resource elements of the same set forms a PHICH group. The PHICHs within the PHICH group are distinguished by different orthogonal sequences. In the FDD system, $n_{PHICH}^{group}$ that is the number of PHICH groups is constant in all of subframes, and may be determined by Equation 1.

$$N_{PHICH}^{group} = \begin{cases} \left\lceil N_g \left(\frac{N_{RB}^{DL}}{8}\right) \right\rceil, & \text{for normal cyclic prefix} \\ 2 \times \left\lceil N_g \left(\frac{N_{RB}^{DL}}{8}\right) \right\rceil, & \text{for extended cyclic prefix} \end{cases} \quad \text{[Equation 1]}$$

In Equation 1, Ng is transmitted in a higher layer through a physical broadcast channel (PBCH), and Ng∈{1/6, 1/2, 1,2}. The PBCH carries system information that is essential for a UE to communicate with an eNB. System information transmitted through the PBCH is called a master information block (MIB).

In contrast, system information transmitted through a physical downlink control channel (PDCCH) is called a system information block (SIB). $N_{RB}^{DL}$ is a downlink bandwidth configuration expressed by a multiplication of $N_{SC}^{RB}$, that is, the size of a resource block in the frequency domain. A PHICH group index $n_{PHICH}^{group}$ is any one integer of 0 to $n_{PHICH}^{group}-1$.

Resources used for a PHICH may be determined based on the smallest PRB index when the resources of a PUSCH are allocated and the cyclic shift value of a demodulation reference signal (DMRS) transmitted in an uplink (UL) grant.

Resources to which a PHICH is mapped (hereinafter referred to as "PHICH resources") may be expressed as $(n_{PHICH}^{group}, n_{PHICH}^{seq})$, that is, an index pair. $n_{PHICH}^{group}$ indicates a PHICH group index, and $n_{PHICH}^{seq}$ indicates an orthogonal sequence index within the PHICH group. The $(n_{PHICH}^{group}, n_{PHICH}^{seq})$ may be determined by Equation 2 below.

$$n_{PHICH}^{group} = (I_{PRB_{RA}} + n_{DMRS}) \bmod N_{PHICH}^{group} + I_{PHICH} N_{PHICH}^{group}, \quad \text{[Equation 2]}$$

$$n_{PHICH}^{seq} = \left(\left\lfloor \frac{I_{PRB_{RA}}}{N_{PHICH}^{group}} \right\rfloor + n_{DMRS}\right) \bmod 2N_{SF}^{PHICH}$$

In Equation 2, the nDMRS is mapped from a cyclic shift for a demodulation reference signal (DMRS) field in the most recent PDCCH having an uplink DCI format for a transport block, which is related to the transmission of a corresponding PUSCH.

In contrast, if a PDCCH having an uplink DCI format for the same transport block is not present, an initial PUSCH for the same transport block is scheduled semi-persistently or when the initial PUSCH is scheduled by a random access response approval signal, the nDMRS is set to 0.

$N_{SF}^{PHICH}$ indicates a spreading factor size used for PHICH modulation.

$I_{PRB\_RA}$ is the same as $I_{PRB\_RA}^{lowest\_index}$ if it is the first transport block of a PUSCH related to a PDCCH or if the number of transport blocks manually recognized when a related PDCCH is not present is not the same as the number of transport blocks indicated in the most recent PDCCH related to the corresponding PUSCH.

In contrast, if it is the second transport block of a PUSCH related to the PDCCH, it is the same as $I_{PRB\_RA}^{lowest\_index}+1$. In this case, $I_{PRB\_RA}^{lowest\_index}$ corresponds to the lowest PRB index of the first slot of the transmission of the corresponding PUSCH.

$n_{PHICH}^{group}$ indicates the number of PHICH groups configured by a higher layer.

$I_{PHICH}$ has "1" if a PUSCH is transmitted in a subframe index 4 or 9 and "0" if not in the uplink-downlink configuration 0 of a TDD system.

Table 5 shows a mapping relation between a cyclic shift for a DMRS field used to determine PHICH resources in a PDCCH having an uplink DCI format and an nDMRS.

TABLE 5

| Cyclic Shift for DMRS Field in PDCCH with uplink DCI format | $n_{DMRS}$ |
|---|---|
| 000 | 0 |
| 001 | 1 |
| 010 | 2 |
| 011 | 3 |
| 100 | 4 |
| 101 | 5 |
| 110 | 6 |
| 111 | 7 |

First, an UL data transmission method in LTE(-A) or 802.16m is described in brief.

A cellular system, such as the LTE(-A) system or 802.16m, uses an eNB scheduling-based resource allocation method.

A UE having data to be transmitted (i.e., UL data) in a system using such an eNB scheduling-based resource allocation method requests resources for corresponding data transmission from an eNB prior to the transmission of the UL data.

The scheduling request of the UE may be performed through scheduling request (SR) transmission through a PUCCH or buffer status report (BSR) transmission through a PUSCH.

Furthermore, if resources for transmitting the SR or BSR have not been allocated to the UE, the UE may request uplink resources from the eNB through an RACH procedure.

The eNB that has received the scheduling request from the UE as described above allocates uplink resources to be used by the corresponding UE to the UE through a downlink control channel (i.e., an UL grant message, DCI n the case of LTE(-A)).

In this case, the UL grant transmitted to the UE may be notified by explicitly signaling that the resources allocated to the UE correspond to the resources of which subframe, but an agreed time may be defined between the UE and the eNB through the allocation of resources for a subframe after a specific time (e.g., 4 ms in the case of LTE).

As described above, what the eNB allocates resources to the UE after X ms (e.g., 4 ms in the case of LTE(-A)) means that the eNB allocates the resources to the UE by taking into consideration all of times taken for the UE to receive and decode the UL grant and to prepare and encode the data to be transmitted.

FIG. 19 is a diagram showing the time taken for a UE to send actual data through a five-step scheduling request procedure using PUCCH SR resources.

As shown in FIG. 19, a UE may transmit actual UL data after about 17 ms from the time when an SR signal is transmitted.

In this case, SR resources allocated to the UE may be allocated on a PUCCH at a specific cycle and may be allocated in a minimum of 1 ms~a maximum of 80 ms cycle.

In this case, if an SR of a 1 ms cycle has been allocated to the corresponding UE, an average time during which the UE waits for the PUCCH resources for the SR transmission is 0.5 ms. A latency time up to the transmission of the data through a scheduling request to an eNB is 17.5 ms.

If the UE has uplink resources previously allocated by the eNB, the UE may send a resource request for newly generated data using the previously allocated resources.

Alternatively, the UE may request additional resources from the eNB by transmitting a BSR in data transmitted through the previously allocated resources.

In this case, as shown in FIG. 20, it may be seen that latency of 9 ms is generated until the UE transmits UL data after it sent the BSR.

If the UE does not have PUCCH SR resources or PUSCH resources allocated by the eNB or uplink synchronization is not matched, the UE may request the resources for the newly generate data using an RACH procedure.

That is, as shown in FIG. 21, latency of 17 ms is generated until the UE transmits UL data from the time when an RACH preamble is transmitted to the eNB.

In this case, PRACH resources through which the RACH preamble may be transmitted may be set at a specific cycle for each cell. If the specific cycle is a cycle of a minimum of 1 ms, data transmission latency of an average of 17.5 ms may be generated.

As described above with reference to FIGS. 19 to 21, the UE transmits actual data after experiencing latency from a minimum of 9 ms to a maximum of 17.5 ms in order to send the UL data.

In this case, there is an advantage in that resource efficiency can be maximized because the eNB allocates optimum resources depending on the channel situation of each UE, but latency in the transmission of the UL data is generated.

As requirements for supporting various real-time application services, such as health care, traffic safety, disaster safety and remote medical control, are increased, 5G communication has an object (target latency: E2E or Radio 1 ms) of constructing an ultra-low latency system having an extremely shortened response time to the extent that a user cannot notice awkwardness although tactile information that belongs to the human's five senses and that is most sensitive to a latency time is provided through the Internet.

In order to provide such a 5G communication service, the latency of data transmission must be minimized, but the data transmission of a current system has been designed to additionally generate the following latency.

Downlink Data Transmission Latency
A connected UE: 0 ms (no latency)
A dormant UE: the latency of an average of 1 ms~1,280 ms (a short DRX cycle: 2~640 ms, a long DRX cycle: 10~2560 ms) is generated depending on a DRX cycle set in the UE An idle UE: the latency of an average of 160 ms~1,280 ms+initial access (a paging cycle: 320~2560 ms, initial access: 50 ms~100 ms (LTE-A: 50 ms/LTE: 100 ms)) is generated depending on a paging DRX cycle set in the UE Latency of Uplink Data Transmission
Synchronized & dormant UE: latency of 17.5 ms is generated (five-step SR)
Unsynchronized UE: latency of 17.5 ms is generated (an SR through an RACH)
A connected UE to which uplink resources have been allocated: 9 ms (data transmission through BSR transmission)

As described above, in order for a UE to send/receive data, various types of time latency may be generated depending on the state of the UE. In particular, the latency of downlink data reception may be generated in various lengths with respect to a dormant UE or a UE in the idle state.

A relation between data reception latency and power consumption needs to be carefully reviewed as one of schemes for reducing the power consumption of a UE.

However, it may be checked that the latency of data transmission in the transmission of UL data is essentially generated additionally because a UE uses an eNB scheduling-based data transmission method although it can send data if necessary.

In the future 5G communication, it is expected that a service for preventing a secondary accident or rapidly handling an urgent situation by rapidly notifying an eNB or a nearby UE/user of information about an accident or state which may be generated by a specific event on time that cannot be expected from various end users, such as the human or machines (a vehicle, a sensor, etc.) will be provided as a major low latency service of 5G.

In this low latency service, a subsequent procedure can be performed by rapidly transmitting UL data.

For this reason, the rapid transmission of UL data, that is, the initiation step of the corresponding service, is one of major elements that affect total service latency.

For these reasons, in order to support a low latency service of a new 5G communication, latency in the transmission of UL data is considered to be a factor that must be reduced.

A method for transmitting uplink (UL) data more rapidly in order to support a low latency service in new 5G (generation) communication is described with reference to FIG. 22.

FIG. 22 is a diagram showing an example of an UL data transmission method for supporting a low latency service.

FIG. 22 shows a situation in which three urgent UEs transmit urgent signals (USs) to an eNB at the same time using PUCCH resources.

The eNB transmits urgent ACK U_ACK for providing notification that an urgent situation has occurred to common UEs. The three urgent UEs send urgent messages after a specific point of time from a point of time at which the USs have been transmitted.

The specific point of time may be determined by taking into consideration the time when the urgent UE encodes the urgent message to be transmitted.

As shown in FIG. 22, the specific point of time may be 4 ms (or 4 subframes) or may be less than 4 ms.

Hereinafter, the transmission of an US through the PUCCH of an urgent UE is referred to as a "PUCCH US transmission", for convenience sake.

Referring to FIG. 22, a plurality of urgent UEs (the three urgent UEs) send the PUCCH USs to the eNB at the same time in a specific subframe SF #1 (S2210).

Thereafter, the eNB transmits U_ACK (urgent ACK), notifying common UEs that an urgent situation has occurred, to the common UE(s) so that the plurality of urgent UEs can preoccupy uplink resources (S2220).

In this case, the U_ACK is received by the plurality of urgent UEs in addition to the common UEs.

Thereafter, the plurality of urgent UEs send urgent messages (or urgent data or urgent PUSCHs) to the eNB and/or other UEs in an SF #5 after a specific point of time from the point of time SF #1 in which the PUCCH USs have been transmitted by taking into consideration the encoding time of the urgent messages to be transmitted (S2230).

The urgent message is transmitted through PUSCH resources, and the transmission of the urgent message may be simply expressed as the transmission of an (UL) urgent PUSCH or the transmission of UL data.

As shown in FIG. 22, PUSCH resources for transmitting the urgent messages are not separately allocated from the eNB to the plurality of urgent UEs, but the plurality of urgent UEs send the urgent messages through UL urgent PUSCH resources at the same time in the specific point of time SF #5.

In such a case, if the plurality of urgent UEs occupy urgent resources at the same time in order to send the urgent messages, there may be a resource collision (or a collision between the urgent messages transmitted) problem.

If such a resource collision problem is generated, more severe transmission latency of UL data and a resource inefficient problem than the transmission of UL data through the aforementioned eNB scheduling-based uplink resource allocation method are generated.

Accordingly, in order to solve the transmission latency of UL data and the inefficient problem of UL resources, this specification provides a method for allocating urgent UL resources to urgent UEs that have transmitted urgent signals through control of an eNB.

In particular, this specification provides a method using a mapping relation with PHICH ACK/NACK resources in order to allocate the urgent UL resources to urgent UEs.

That is, in an UL data transmission method through the allocation of urgent UL resources proposed by this specification, if a specific UE encounters an urgent situation, it can transmit UL data (urgent message) including its own location and situation information to an eNB and/or other UEs at an accurate and low error rate.

In particular, there is provided a method capable of allocating urgent uplink resources (urgent UL resources) without a collision between UEs if one or more UEs send urgent signals to an eNB at the same time in the same sub-frame (TTI) and can request the use of urgent resources at the same time in a service that belongs to urgent services and in which the event of an urgent situation may be generated with respect to one or more UEs at the same time and at the same location (e.g., a service in which the transmission of specific urgent messages is requested at the same time due to the generation of a collision between vehicles, such as traffic safety).

FIG. 23 is a diagram showing an example of an urgent UL data transmission method proposed by this specification.

That is, FIG. 23 shows a rapid uplink (UL) data transmission method for supporting a low latency service of (new) 5G and a method for solving a resource collision problem when UL data is transmitted.

In this specification, the urgent UL data transmission method may include the following three configurations.

The transmission of an urgent signal (US) of a UE through PUCCH resource allocation The reception of urgent positive acknowledgement (urgent ACK) of a UE through PHICH ACK/NACK resources mapped to PUCCH urgent signal (US) resources. The mapping of urgent UL resources of a UE through PHICH urgent ACK reception Referring to FIG. 23, a plurality of urgent UEs urgent signals (USs) to an eNB (S2310).

The urgent UE indicates a UE that transmits data related to a low latency service, such as urgent data, and may be expressed as an urgent UE, the first UE or the like.

Whether a UE is an urgent UE (i.e., the type of UE) may be checked through an RRC connection establishment procedure.

An urgent UE and the first UE are interchangeably used, for convenience sake.

A low latency service may mean a service related to health care, traffic safety, disaster safety and remote medical control which are now chiefly discussed in current 5G communication.

In a wireless communication system supporting such a low latency service, a specific UE notifies an eNB, surrounding other UEs and a user of information about an accident or state which may be generated by a specific event so that people can eventually rapidly handle a secondary accident or an urgent situation.

In this case, the urgent signal means a signal which is used for an urgent UE to detect the generation of an urgent situation and to notify an eNB of the detection of the generation of the urgent situation.

Furthermore, the urgent UE may transmit the urgent signal through a PUCCH.

A US transmitted through a PUCCH may be simply expressed as a "PUCCH US."

A detailed method of transmitting a PUCCH US is described in detail later with reference to FIG. 24.

Thereafter, when the eNB receives the PUCCH USs from the plurality of urgent UEs, it transmits PHICH A/N resources mapped to PUCCH US resources to the urgent UEs and/or common UEs as a response to the PUCCH USs (S2320).

The response to the PUCCH US may be PHICH (urgent) ACK/NACK or PHICH U_ACK.

That is, the PHICH A/N resources may be determined using the lowest PRB index of the first or second slot of PUCCH resources through which a US is transmitted.

The common UE means a UE not sending an urgent signal, and the response to the PUCCH US corresponds to a signal also received by the common UEs in addition to the urgent UEs.

Thereafter, the urgent UE that has received the positive acknowledgement PHICH U_ACK for the PUCCH US through the PHICH from the eNB determines PUSCH resources for transmitting an urgent message or urgent data or checks the location of the PUSCH resources through the received PHICH U_ACK (S2330).

Thereafter, the urgent UE transmits the urgent message to the eNB and/or other UEs through the determined PUSCH resources (S2340).

Referring to FIG. 23, the plurality of urgent UEs transmits the PUCCH USs to the eNB at the same time in an UL subframe (SF) #1.

Thereafter, the eNB transmits PHICH U_ACK to the urgent UEs through a PHICH in a DL SF #3.

The PHICH U_ACK is transmitted through PHICH resources mapped to each PUCCH US resource.

Thereafter, the urgent UEs determine the resources of an urgent PUSCH for the transmission of the urgent message based on the received PHICH U_ACK, and transmits the urgent message to the eNB and/or other UEs through the determined PUSCH resource UL SF #5 by taking into consideration the encoding time of the urgent message to be transmitted.

Hereinafter, the three configurations described in FIG. 23 will be described in more detail with reference to the drawings.

Urgent Signal Transmission of UE Through PUCCH Resource Allocation

First, a method for urgent UEs to transmit PUCCH USs will be described.

FIG. 24 is a flowchart illustrating an example of a method for transmitting urgent uplink data proposed in this specification.

Steps S2420 to S2450 are identical to steps S2310 to S2340 of FIG. 23 and detailed description thereof is thus omitted.

In FIG. 24, it is assumed that UEs are in an RRC_connected state through an RRC connection establishment procedure with respect to an eNB.

The RRC connection establishment procedure is performed through transmission and reception of an RRC connection request message, an RRC connection setup message and an RRC connection setup complete message between the UE and the eNB.

In addition, the UEs may refer to urgent UEs and/or normal UEs.

First, the eNB allocates resources for urgent signal (US) transmission to the urgent UEs through the RRC connection establishment procedure (S2410).

Specifically, the eNB assigns different $n_{DMRS}$ values (DMRS: Demodulation Reference Signal) to the urgent UEs in order to allocate resources for US transmission.

$n_{DMRS}$ indicates a DMRS index corresponding to a cyclic shift value for a DMRS field in a PDCCH having a UL DCI format. Refer to Table 5 for details.

$n_{DMRS}$ allocated per urgent UE corresponds to information necessary to map PUCCH US resources to different PHICH groups.

Then, the urgent UEs transmit USs to the eNB using the US resources allocated through the RRC connection establishment procedure (S2420).

The urgent UEs may transmit the USs to the eNB through a PUCCH.

That is, RRC connection with the eNB is established for the urgent UEs allocated PUCCH US transmission resources by the eNB, and PUCCH resources for the urgent signals of the urgent UEs have been allocated in advance in the RRC connection procedure for RRC connection between the eNB and the urgent UEs.

A method of allocating resources for USs to urgent UEs may be similar to a method of allocating PUCCH scheduling request (SR) resources in an LTE(-A) system.

However, the method of allocating resources for USs differs from the method of allocating SR resources in terms of the following.

That is, allocation of resources for USs limits a maximum number of USs which can be mapped to one RE to $N_{DMRS}$ such that PUCCH US resources can be mapped to PHICH resources.

This is because $N_{DMRS}$ mapped to PHICH resources is limited to 8 in the LTE(-A) system.

As described above, a PUSCH DMRS has indexes of 0 to 7 in the LTE(-A) system when maximum 8-layer MIMO is used.

Further, a PUCCH US resource is allocated only to the lowest or highest PRB index of the first or second slot of a PUCCH.

For example, it is assumed that a total of four RBs (m=0 (2611 and 2621), m=1 (2612 and 2622), m=2 (2613 and 2623), m=3 (2614 and 2624)) are allocated as a PUCCH resource, as illustrated in FIG. 26.

The four RBs can be composed of two lowest PRB indexes (m=0, 2) and two highest PRB indexes (m=1, 3).

If a US is allocated to RBs corresponding to m=1, 3 in the PUCCH resource, a resource for a US cannot be allocated to RBs corresponding to m=0, 2.

More specifically, a maximum of 36 SR PUCCHs is multiplexed and transmitted using a CAZAC sequence having a length of 12 and a 3-symbol RB part for 1 RB PUCCH resource (12 subcarriers).

This means that SRs for a total of 36 UEs can be transmitted with the same PRB index.

Since SR transmission through a PUCCH does not require mapping with PHICH ACK/NACK resources, data can be identified between a transmitter and a receiver using different CAZAC/OC sequences even when the data has the same PRB index.

In contrast, in PUCCH US transmission proposed in this specification, PUCCH USs are mapped to PHICH A/N resources such that different PUSCH resources are allocated to respective UEs, distinguished from PUCCH scheduling request (SR) transmission.

Accordingly, to map $N_{DMRS}$ PUCCH USs transmitted with the same PRB index from the urgent UEs to different PHICH resources (or PHICH groups), the eNB allocates different $N_{DMRS}$ values to the urgent UEs when allocating US resources.

That is, the eNB allocates resources for PUCCH US transmission to the urgent UEs through the RRC connection establishment procedure.

The eNB allocates different $N_{DMRS}$ values to the urgent UEs in the resource allocation process.

Then, the urgent UEs transmit PUCCH USs to the eNB through the allocated PUCCH US resources.

The PHICH ACK/NACK resources may be determined by PRB indexes of PUCCH US resources.

That is, one bit of a PHICH ACK/NACK resource having a size of 2 bits can be determined by the lowest or highest PRB index of the first slot of a PUCCH US resource and the other one bit can be determined by the highest or lowest PRB index of the second slot in a frequency hopping relationship with the first slot.

Accordingly, when the PHICH ACK/NACK resource is composed of 2 bits, the 2 bits can be respectively mapped to PRB indexes allocated in order to transmit one PUCCH US.

The PRB indexes allocated in order to transmit one PUCCH US refer to a specific PRB index of the first slot and a specific PRB index of the second slot in a frequency hopping relationship with the first slot.

For example, the 2-bit PHICH ACK/NACK resource is mapped to m=0 of the first slot and m=0 of the second slot of a PUCCH US resource.

Subsequently, the eNB transmits PHICH urgent ACK to the urgent UEs using PHICH resources mapped to PUCCH US resources of the urgent UEs (S2430).

The PHICH urgent ACK may have a size of 2 bits.

Thereafter, the urgent UEs determine PUSCH transmission resources for urgent message transmission through the PHICH urgent ACK (S2440) and transmit urgent messages to the eNB and/or other UEs through the determined resources (S2450).

Reception of 2-Bit Urgent ACK Through Two PHICH Resources Mapped to PUCCH US Resource Next, a method for transmitting/receiving 2-bit urgent ACK between a UE and an eNB through two PHICH resources mapped to one PUCCH US resource will be described.

FIG. 25 is a flowchart illustrating an example of a method for transmitting urgent uplink data proposed in this specification.

In FIG. 25, when one or more UEs transmit urgent signals through a PUCCH US resource, an eNB transmits 2-bit urgent resource information to the urgent UEs through two PHICH resources mapped to the US resource upon reception of the urgent signals.

That is, the eNB transmits 2-bit information to the UEs by mapping two PHICH resources to one PUCCH US.

The urgent UEs transmit PUCCH USs to the eNB through PUCCH US resources allocated through an RRC connection establishment procedure (S2510).

Then, the eNB determines PHICH resources for transmitting a response to the PUCCH USs to the urgent UEs (S2520).

Here, one PUCCH resource is mapped to two PHICH resources to constitute a 2-bit PUCCH US response.

The eNB determines PHICH resources for transmitting a response (PUCCH U_ACK) to the PUCCH USs in consideration of a mapping relationship between the received PUCCH US resources and PHICH resources.

The mapping relationship between the PUCCH resources and PHICH resources uses an index pair, similarly to the PHICH resource configuration method in the LTE(-A) system, and can be defined as represented by the following equations 3 and 5.

That is, PHICH resources proposed in this specification are mapped to one PUCCH US resource in the form of an index pair as represented by Equations 4 and 7, as illustrated in FIG. 26.

An index pair corresponding to each bit of a PHICH resource is determined by the lowest index of PUCCH PRBs allocated to the first slot and the highest index of a PUCCH PRB allocated to the second slot in a frequency hopping relationship with the first slot, instead of the lowest PRB index for a conventional PUSCH TB, as illustrated in FIG. 26.

FIG. 26 illustrates an example of a PUCCH physical resource block (PRB) index for PHICH resource configuration proposed in this specification.

$$\text{Index pair for the first bit} = (n_{PHICH}^{group}, n_{PHICH}^{seq}) \quad \text{[Equation 4]}$$

Here, $n_{PHICH}^{group}$ indicates a PHICH group index and $n_{PHICH}^{seq}$ indicates an orthogonal sequence index in the PHICH group.

$n_{PHICH}^{group}$ and $n_{PHICH}^{seq}$ can be defined as represented by Equations 5 and 6.

$$n_{PHICH}^{group} = (I_{PRB_{RA}} + n_{DMRS}) \bmod N_{PHICH}^{group} + I_{PHICH} N_{PHICH}^{group} \quad \text{[Equation 5]}$$

$$n_{PHICH}^{seq} = (\lfloor I_{PRB\_RA}/N_{PHICH}^{group} \rfloor + n_{DMRS}) \bmod 2N_{SF}^{PHICH} \quad \text{[Equation 6]}$$

Here, $n_{DMRS}$ is mapped from a cyclic shift for a DMRS (demodulation reference signal) field in the latest PDCCH having an uplink DCI format for a transport block related to corresponding PUSCH transmission.

Refer to Table 5 for a mapping relationship related thereto.

When there is no PDCCH having the uplink DCI format for the same transport block, if an initial PUSCH for the same transport block is semi-persistently scheduled or scheduled according to a random access response ACK signal, $n_{DMRS}$ is set to "0."

$N_{SF}^{PHICH}$ indicates the size of a spreading factor used for PHICH modulation and is "4" in the case of a normal cyclic prefix (CP) and "2" in the case of an extended CP.

$I_{PRB\_RA}$ corresponds to the lowest PRB index $I_{PRB\_RA}^{lowest\_index}$ in the first slot of a PUCCH resource allocated for US transmission.

$n_{PHICH}^{group}$ indicates the number of a PHICH group configured by a higher layer.

$I_{PHICH}$ is "1" when a PUSCH is transmitted at subframe index 4 or 9 in uplink-downlink configuration 0 of a TDD system and "0" otherwise.

$$\text{Index pair for the second bit} = (n_{PHICH}^{group}, n_{PHICH}^{seq}) \quad \text{[Equation 7]}$$

Here, $n_{PHICH}^{group}$ indicates a PHICH group index and $n_{PHICH}^{seq}$ indicates an orthogonal sequence index in the PHICH group.

$n_{PHICH}^{group}$ and $n_{PHICH}^{seq}$ can be defined as represented by Equations 8 and 9.

$$n_{PHICH}^{group} = (I_{PRB_{RA}} + n_{DMRS}) \bmod N_{PHICH}^{group} + I_{PHICH} N_{PHICH}^{group} \quad \text{[Equation 8]}$$

$$n_{PHICH}^{seq} = (\lfloor I_{PRB\_RA}/N_{PHICH}^{group} \rfloor + n_{DMRS}) \bmod 2N_{SF}^{PHICH} \quad \text{[Equation 9]}$$

Here, $n_{DMRS}$ is mapped from a cyclic shift for a DMRS (demodulation reference signal) field in the latest PDCCH having an uplink DCI format for a transport block related to corresponding PUSCH transmission.

Refer to Table 5 for a mapping relationship related thereto.

When there is no PDCCH having the uplink DCI format for the same transport block, if an initial PUSCH for the same transport block is semi-persistently scheduled or scheduled according to a random access response ACK signal, $n_{DMRS}$ is set to "0."

$N_{SF}^{PHICH}$ indicates the size of a spreading factor used for PHICH modulation and is "4" in the case of a normal cyclic prefix (CP) and "2" in the case of an extended CP.

$I_{PRB\_RA}$ corresponds to the highest PRB index of the second slot in a frequency hopping relationship with the lowest PRB index $I_{PRB\_RA}^{lowest\_index}$ of the first slot of a PUCCH resource.

$n_{PHICH}^{group}$ indicates the number of a PHICH group configured by a higher layer.

$I_{PHICH}$ is "1" when a PUSCH is transmitted at subframe index 4 or 9 in uplink-downlink configuration 0 of a TDD system and "0" otherwise.

Subsequently, the eNB transmits 2-bit urgent ACK/NACK, that is, a response to the PUCCH USs, to the urgent UEs through 2 PHICH resources determined through Equations 4 to 9 (S2530).

Here, 2-bit PHICH urgent ACK can have the following meanings.

① Urgent resource position notification information for urgent PUSCH transmission ②  Subframe offset information of urgent resource for urgent PUSCH transmission ③ MCS and resource size information of urgent resource for urgent PUSCH transmission Hereinafter, the meanings of the 2-bit PHICH urgent ACK will be described in more detail.

Urgent Resource Position Notification Information for Urgent PUSCH Transmission

The 2-bit PHICH urgent ACK transmitted to urgent UEs may be an indicator indicating a specific resource in PUSCH urgent resources.

Here, the PUSCH urgent resources may refer to some PUSCH resources ($N_{PUSCH\_RB} > N_{PUSCH\_U\_RB}$) of a specific cell or resources ($N_{PUSCH\_RB} = N_{PUSCH\_U\_RB}$) for the entire band.

$N_{PUSCH\_RB}$ represents a total number of RBs in a PUSCH resource and $N_{PUSCH\_U\_RB}$ represents a total number of RBs allocated for urgent PUSCH transmission in the PUSCH resource.

Information about the PUSCH urgent resources may be shared by UEs and an eNB through SIB in advance. Here, it is assumed that the information is shared in advance.

The PUSCH urgent resources are used only when an urgent signal indicating an urgent situation is received from an urgent UE and may be used for normal UEs in situations other than urgent situations.

In the case of 2-bit PHICH urgent ACK, this means that up to four urgent resources can be allocated.

FIG. 27 illustrates an example of a method of determining PUSCH urgent resources proposed in this specification.

Specifically, FIG. 27 illustrates an example of a case of 1.4 MHz band in which a total number of RBs of all PUSCH resources is 6.

Referring to FIG. 27, 2-bit PHICH urgent ACK resource information can be used in a manner as shown in Table 6.

TABLE 6

| 2 bits PHICH urgent ACK(value) | Urgent RB index |
|---|---|
| 0b00 | 0 |
| 0b01 | 1 |
| 0b10 | 2 |
| 0b11 | 3 |

Here, urgent RB (2730) refers to resource blocks composed of $N_u$ PRBs (2740), and $N_u$ may be defined by $N_{PUSCH\_U\_RB}$ (e.g., $N_u = N_{PUSCH\_U\_RB}/4$).

$N_{PUSCH\_U\_RB}$ (2750) represents a total number of RBs of a PUSCH urgent resource.

In FIG. 27, bits 2710 and 2720 of a DL PHICH have an index pair form as described above and indicate values respectively mapped through the PRB indexes of the first and second slots of one PUCCH US resource.

The PRB index of the second slot refers to a PRB index in a frequency hopping relationship with the PRB index of the first slot.

In addition, each bit of the DL PHICH may have a value of "0" or "1" according to ACK or NACK.

Referring to FIG. 27 and Table 6, the 2-bit DL PHICH ACK information is mapped to urgent RB 2 when having a value of "10" and mapped to urgent RB 3 when having a value of "11."

Subframe Offset Information of Urgent Resources for Urgent PUSCH Transmission

In addition, the 2-bit PHICH urgent ACK transmitted to urgent UEs may refer to an indicator indicating subframe information of PUSCH urgent resources.

As described above, the PUSCH urgent resources may refer to some PUSCH resources ($N_{PUSCH\_RB} > N_{PUSCH\_U\_RB}$) of a specific cell or resources ($N_{PUSCH\_RB} = N_{PUSCH\_U\_RB}$) for the entire band. It is assumed that one urgent resource is present in a specific time (TTI or subframe).

In addition, the PUSCH urgent resources are used only when an urgent signal indicating an urgent situation is received and correspond to a resource region which can be used for normal UEs in situations other than urgent situations.

When the 2-bit resource information is used for PHICH urgent ACK transmission, this means that urgent resources for four consecutive subframes can be allocated.

FIG. 28 illustrates another example of the method of determining PUSCH urgent resources proposed in this specification.

As illustrated in FIG. 28, a start point of an SF offset to which PUSCH urgent resources are allocated may depend on cell scheme.

2-bit PHICH urgent ACK information signals an SF offset of PUSCH urgent resources in order to allow only one UE to preoccupy an urgent resource at a specific time although one or more UEs have request urgent resources.

Referring to FIG. 28, the PHICH urgent ACK resource information can be used in a manner as shown in Table 7.

TABLE 7

| 2 bits PHICH urgent ACK(value) | Subframe offset |
|---|---|
| 0b00 | 0 |
| 0b01 | 1 |
| 0b10 | 2 |
| 0b11 | 3 |

Referring to FIG. 28, the start point of the PUSCH urgent resources may be subframe SF #4 which follows subframe SF #3 in which the 2-bit PHICH urgent ACK is received or subframe SF #5.

In FIG. 28, option 1 indicates that a subframe offset starts from subframe SF #4 which follows subframe SF #3 in which the 2-bit PHICH urgent ACK is received and option 2 indicates that a subframe offset starts from subframe SF #5 2 SFs after subframe SF #3 in which the 2-bit PHICH urgent ACK is received.

Further, when the 2-bit PHICH urgent ACK information indicates subframe offset information of PUSCH urgent resources, SF information for urgent PUSCH transmission and the PHICH ACK information may be defined such that they are used together.

That is, when urgent resources for one or more urgent UEs are allocated to one subframe, urgent resources in a specific SF may be sequentially allocated to UEs which have received the same 2-bit PHICH urgent ACK information.

That is, UEs which have received the same SF offset indicating an urgent resource position can map a specific urgent resource LRB index in a specific SF through a specific method.

The specific method will be described in detail below.

Transmission of MCS and Resource Size Information of Urgent Resources for Urgent PUSCH Transmission In addition, the 2-bit PHICH urgent ACK transmitted to urgent UEs may refer to an indicator indicating MCS (Modulation and Coding Scheme) level information of PUSCH urgent resources.

As described above, the PUSCH urgent resources may refer to some PUSCH resources ($N_{PUSCH\_RB} > N_{PUSCH\_U\_RB}$) of a specific cell or resources ($N_{PUSCH\_RB} = N_{PUSCH\_U\_RB}$) for the entire band. It is assumed that one urgent resource is present in a specific time (TTI or subframe).

The PUSCH urgent resources are used only when an urgent signal indicating an urgent situation is received and correspond to a resource region which can be used for normal UEs in situations other than urgent situations.

That is, when the 2-bit PHICH urgent ACK information indicates MCS and resource size information, an urgent resource size and MCS level indicated by each piece of information can be allocated to one of four modes defined as shown in Table 8.

Table 8 shows an example of URB MCS index definition.

While conventional MCS indexes define 32 combinations of 5 bits, the 2-bit PHICH urgent ACK information proposed in this specification defines four combinations which can be used for urgent resources.

TABLE 8

| 2-bit PHICH urgent ACK(value) | URB MCS index | Modulation order | TBS Index |
|---|---|---|---|
| 0b00 | 0 | 2 | 0 |
| 0b01 | 1 | 4 | 1 |
| 0b10 | 2 | 6 | 2 |
| 0b11 | 3 | 2 | 1 |

In Table 8, TBS represents a transport block size.

Subsequently, the urgent UEs determine PUSCH resources for transmitting urgent messages through urgent ACK received from the eNB (S2540) and transmit the urgent messages or urgent data to the eNB through the determined PUSCH resources (S2550).

Urgent Resource Mapping Per UE Through Reception of PHICH Urgent ACK

Next, urgent resource mapping for urgent message transmission of urgent UEs through PHICH ACK reception, that is, a method of determining an urgent PUSCH resource position will be described in detail.

PHICH ACK/NACK mapped to urgent signal resources is information which needs to be checked by all UEs in a cell, that is, all UEs (i.e., RRC_connected UEs) which monitor downlink control channels in a cell as well as urgent UEs which have transmitted USs.

Therefore, a method through which UEs transmit UL data, that is, PUSCHs upon reception of urgent ACK from an eNB will be described.

Specifically, a method through which urgent UEs transmit urgent messages, that is, urgent PUSCHs, and a method through which normal UEs transmit UL data, that is, PUSCHs, will be separately described.

Urgent PUSCH Transmission of Urgent UEs Upon Reception of PHICH of the Same SF Offset Information A description will be given of a method of determining urgent resources for transmitting urgent messages (or urgent data or urgent PUSCHs) when a plurality of urgent UEs receives the same 2-bit PHICH urgent ACK.

Here, it is assumed that the 2-bit PHICH urgent ACK refers to SF offset information indicating a PUSCH urgent resource position.

This method sequentially allocates urgent resources in a specific SF to UEs which have received the same 2-bit PHICH urgent ACK information when urgent resources for one or more urgent UEs are allocated to one subframe.

FIG. 29 illustrates another example of the method of determining urgent resources for transmitting an urgent message proposed in this specification.

First, an urgent UE transmits a US to an eNB through a PUCCH US resource allocated thereto.

Then, the urgent UE receives a response to the PUCCH US, that is, urgent ACK/NACK from the eNB.

The urgent ACK/NACK is transmitted through a PHICH and may be represented as PHICH urgent ACK/NACK.

Further, the PHICH urgent ACK/NACK resource has a size of 2 bits each of which takes the form of an index pair composed of a PHICH group number and a PHICH sequence index in the PHICH group.

In addition, each bit of the 2-bit PHICH urgent ACK/NACK resource is mapped to each PRB index of the PUCCH US resource.

For example, each bit of the 2-bit PHICH urgent ACK/NACK resource can be mapped to the lowest PRB index of the first slot of one PUCCH US resource and the highest PRB index of the second slot in a frequency hopping relationship therewith.

The urgent UE monitors all PHICH urgent ACK/NACK resources which can be allocated to other urgent UEs in the corresponding cell or have been allocated thereto simultaneously with reception of the 2-bit PHICH urgent ACK/NACK.

The urgent UE may check the following through PHICH ACK/NACK monitoring.

A PUCCH US resource through which an urgent UE transmits a PUCCH US is predefined in the cell. The PUCCH US resource can be allocated through an RRC connection procedure or a PDCCH.

Otherwise, a HARQ ACK/NACK resource mapped to a PUCCH resource has capability but remains as a resource region which is not used.

Here, the urgent UE needs to check all urgent UEs which receive PHICH urgent ACK through PHICH urgent ACK/NACK resources mapped to all PUCCH US resources.

The 2-bit PHICH urgent ACK/NACK resource mapped to the PUCCH US resource can be shared by all UEs and the eNB in the cell in advance.

Subsequently, the urgent UE calculates a logical resource block (LRB) index thereof among UEs which have received the same SF offset information as that received thereby using the 2-bit PHICH urgent ACK transmitted from the eNB.

The LRB index refers to a resource block (RB) index allocated to only urgent UEs which will receive the 2-bit PHICH urgent ACK (mapped to the PUCCH US resource).

Specifically, the urgent UE increases the logical RB index by "1" in each SF offset for the 2-bit PHICH urgent ACK transmitted to other urgent UEs until the 2-bit PHICH urgent ACK is received in a PHICH resource mapped to the PUCCH US resource thereof.

Thereafter, the urgent UE stores the LRB index value finally counted in the same SF offset upon reception of 2-bit PHICH U_ACK thereof.

In FIG. 29, there are five urgent UEs in a cell, the five urgent UEs simultaneously transmit PUCCH USs to an eNB, and the eNB transmits 2-bit PHICH urgent ACK mapped to each PUCCH US resource to the five urgent UEs.

PUSCH urgent resources for UE1, UE2 and UE3 are allocated to subframe offset #1 (2930) of a UL PUSCH through LRB 0, LRB 1 and LRB 2 (2910), respectively, and PUSCH urgent resources for UE4 and UE5 are allocated to subframe offset #2 (2940) of the UL PUSCH through LRB 0 and LRB 1 (2920), respectively.

Referring to FIG. 29, a DL PHICH (2950) refers to a 2-bit PHICH ACK/NACK resource transmitted from the eNB to the UEs, and a UL PUSCH (2960) refers to a UL PUSCH resource transmitted from each UE to the eNB. It is assumed that UE1 to UE5 are urgent UEs.

As illustrated in FIG. 29, UE2 increases an LRB index for the corresponding SF offset by 1 by monitoring 2-bit PHICH U_ACK reception of UE1 until 2-bit PHICH U_ACK thereof is received.

It is assumed that an initial LRB index value is 0.

Subsequently, UE2 confirms the same SF offset through reception of the 2-bit PHICH U_ACK thereof and stores the finally counted LRB index=1 as the LRB index thereof.

That is, UE1 stores "LRB 0", UE2 stores "LRB 1" and UE3 stores "LRB 2".

As illustrated in FIG. 29, the highest LRB index is determined depending on the SF offset value of the UL PUSCH.

That is, the highest LRB index for 3 urgent UEs UE1, UE2 and UE3 to which urgent resources are allocated in UL SF offset #1 is "2".

In addition, the highest LRB index for 2 urgent UEs UE4 and UE5 to which urgent resources are allocated in UL SF offset #2 is "1".

Subsequently, the urgent UEs receive PHICH U_ACK for all PUCCH US resources allocated in the same SF offset allocated in the cell and calculate $N_{U\_LRB}$.

$N_{U\_LRB}$ indicates a total number of LRB indexes of urgent PUSCH resources which can be used in one subframe.

The urgent UEs calculate $N_{U\_LRB}$ using Equation 10.

$$N_{U\_PRB} = \text{highest LRB} + 1 \quad \text{[Equation 10]}$$

That is, the urgent UEs increase the highest LRB index by "1" whenever other urgent UEs receive PHICH U_ACK for the same SF offset, and when all PHICH U_ACK signals are received, determine $N_{U\_LRB}$ for each SF offset as "highest LRB+1" and store this value.

$N_{U\_LRB}$ for each SF offset can be represented as follows.

$N_{SF0\_U\_LRB}$ for SF offset 0=Highest $LRB_{SF0}$+1
$N_{SF1\_U\_LRB}$ for SF offset 1=Highest $LRB_{SF1}$+1
$N_{SF2\_U\_LRB}$ for SF offset 2=Highest $LRB_{SF2}$+1
$N_{SF3\_U\_LRB}$ for SF offset 3=Highest $LRB_{SF3}$+1

As illustrated in FIG. 29, UE2 increases the highest LRB index by "1" for SF offset #1 whenever UE1 and UE3 receive PHICH U_ACK.

That is, since highest LRB index=2 and $N_{U\_LRB}$=3 in SF offset #1, UEs (UE1, UE2 and UE3) to which PUSCH urgent resources are allocated in SF offset #1 store $N_{U\_LRB}$ "3".

In addition, UE5 increases the highest LRB index by "1" for SF offset #2 when UE4 receives PHICH U_ACK.

That is, since highest LRB index=1 and $N_{U\_LRB}$=2 in SF offset #2, UEs (UE4 and UE5) to which PUSCH urgent resources are allocated in SF offset #2 store $N_{U\_LRB}$ "2".

Then, the urgent UEs calculate PUSCH physical RB indexes thereof for transmitting urgent messages (urgent PUSCHs) using LRB indexes acquired by receiving the 2-bit PHICH urgent ACK and $N_{U\_LRB}$ calculated through Equation 7.

Here, the PUSCH physical RB indexes are calculated through Equation 11.

$$\text{PRB Index of PUSCH} = (\text{LRB Index} \times N_u) + \text{Lowest PRB index of PUSCH} \quad \text{[Equation 11]}$$

Here, $N_u$ (2970) indicates a resource size that can be occupied by one UE for urgent PUSCH resources which can be used in one subframe. $N_u$ may be predefined through system information or may be determined depending on the number of PHICH urgent ACK signals using Equation 12.

$$N_u = \lfloor N_{PUSCH\_RB} / N_{SFN\_U\_LRB} \rfloor \quad \text{[Equation 12]}$$

Here, $N_{PUSCH\_RB}$ indicates a total number of RBs of UL PUSCH resources and $N_{SFN\_U\_LRB}$ indicates a total number of LRB indices in a specific subframe.

In Equation 12, $\lfloor x \rfloor$ represents a largest value among integers which do not exceed x. For example, $\lfloor 3.1 \rfloor$ represents "3".

PUSCH Transmission Method of Normal UEs

A description will be given of a method through which normal UEs that do not transmit a US transmit a PUSCH when urgent UEs transmit a PUCCH US.

FIG. 30 is a flowchart illustrating an example of a PUSCH transmission method of normal UEs proposed in this specification.

A normal UE which does not transmit an urgent signal monitors 2-bit PHICH urgent A/N resources mapped to PUCCH US resources and transmitted to urgent UEs while monitoring a PHICH mapped to a PUSCH resource transmitted thereby in order to receive HARQ ACK/NACK which can be transmitted thereto (S3010).

When the normal UE discovers at least one urgent UE which receives 2-bit PHICH urgent ACK among the PHICH urgent A/N resources as the monitoring result, the normal UE determines whether a UL SF for a UL grant previously received from an eNB corresponds to a UL SF to be occupied by the discovered urgent UE for urgent message transmission (S3020).

When it is determined that the UL SF for the UL grant of the normal UE corresponds to the UL SF to be occupied by the discovered urgent UE, the normal UE cancels or defers all uplink data transmissions in the UL SF (S3030).

When it is determined that the UL SF for the UL grant of the normal UE does not correspond to the UL SF to be occupied by the discovered urgent UE, the normal UE transmits uplink data in the allocated UL SF (S3040).

Alternatively, when the aforementioned $N_u$ is predefined through SI (System Information), that is, when normal UEs can be aware of $N_u$ through SI in advance, the normal UE may cancel or defer uplink data transmission only in resources occupied by the urgent UE in the UL SF instead of canceling or deferring all UL data transmission in the UL SF.

The normal UE can also calculate urgent PUSCH resource information of all urgent UEs through the above-described method by monitoring 2-bit PHICH U_ACK/NACK mapped to PUCCH US resources.

The method of canceling or deferring UL data transmission only in a specific resource of the UL SF is described in more detail. The normal UE compares a UL grant resource allocated thereto with a UL grant resource to be allocated to an urgent UE.

When the UL grant resource allocated to the normal UE does not correspond to the urgent resource to be allocated to the urgent UE (or collision therebetween does not occur), the normal UE transmits uplink data (PUSCH) to the eNB through the UL grant resource allocated thereto.

For example, when it is assumed that $N_u$ is transmitted to UEs in a cell through SI, $N_{U\_LRB}$ is 4, and the number of urgent UEs is 2, resources for LRB index 2 and LRB index 3 can correspond to resources which are not used for urgent message transmission.

That is, the urgent UEs transmit urgent messages through LRB index 0 and LRB index 1 and do not transmit urgent messages through LRB index 2 and LRB index 3.

The urgent resource may refer to resources corresponding to LRB index 0 and LRB index 1.

Accordingly, the normal UE transmits UL data to the eNB using resource regions corresponding to LRB index 2 and LRB index 3.

When the UL grant resource allocated to the normal UE corresponds to the urgent resource, the normal UE cancels or defers UL data transmission in the UL grant resource.

Apparatus to which the Present Invention is Applicable

FIG. 31 is a block diagram of a wireless communication apparatus to which the methods proposed in this specification are applicable.

Referring to FIG. 31, a wireless communication system includes an eNB 3110 and a plurality of UEs 3120 located in the coverage of the eNB 3110.

The eNB 3110 includes a processor 3111, a memory 3112 and a radio frequency (RF) unit 3113. The processor 3111 realizes functions, processes and/or methods proposed in FIGS. 1 to 30. Wireless interface protocol layers may be realized by the processor 3111. The memory 3112 is connected to the processor 3111 and stores various types of information for driving the processor 3111. The RF unit 3113 is connected to the processor 3111, and transmits and/or receives RF signals.

The UE 3120 includes a processor 3121, a memory 3122 and an RF unit 3123. The processor 3121 realizes functions, processes and/or methods proposed in FIGS. 1 to 30. Wireless interface protocol layers may be realized by the processor 3121. The memory 3122 is connected to the processor 3121 and stores various types of information for driving the processor 3121. The RF unit 3123 is connected to the processor 3121, and transmits and/or receives RF signals.

The memories 3112 and 3122 may be provided inside or outside of the processors 3111 and 3121 and connected to the processors 3111 and 3121 through various known means.

In addition, the eNB 3110 and/or the UE 3120 may include a single antenna or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

The embodiments of the present invention may be achieved by various means, for example, hardware, firmware, software, or a combination thereof. In a hardware configuration, the methods according to the embodiments of the present invention may be achieved by one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, microcontrollers, microprocessors, etc.

In a firmware or software configuration, the embodiments of the present invention may be implemented in the form of a module, a procedure, a function, etc. Software code may be stored in a memory unit and executed by a processor. The memory unit may be located at the interior or exterior of the processor and may transmit data to and receive data from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While examples in which the method for transmitting uplink data in a wireless communication system is applied to 3GPP LTE/LTE-A have been described, the present invention is applicable to various wireless communication systems in addition to 3GPP LTE/LTE-A.

The invention claimed is:

1. A method for transmitting, by a first user equipment (UE), uplink (UL) data in a wireless communication system supporting a low latency service, the method comprising:
   transmitting, to a base station, an urgent signal (US) for informing occurrence of an event related to an urgent situation on a physical uplink control channel (PUCCH) resource;
   receiving, from the base station, a 2-bit response to the urgent signal on two physical HARQ (hybrid automatic repeat request) indication channel (PHICH) resources;
   determining a resource position for transmitting urgent data including detailed information related to the occurred event based on the 2-bit response; and
   transmitting, to the base station, the urgent data on the determined resource position,
   wherein each of the two PHICH resources is determined by a physical resource block (PRB) index of a resource on which the urgent signal is transmitted,
   wherein one of the two PHICH resources is determined by a PRB index of a first slot of the PUCCH resource and the other one of the two PHICH resources is determined by a PRB index of a second slot of the PUCCH resource, and
   wherein the determining of the resource position comprises:
   increasing a logical resource block (LRB) index in a subframe related to a received 2-bit PHICH urgent ACK of other first UEs by "1" whenever receiving the 2-bit PHICH urgent ACK of the other first UEs before receiving a 2-bit PHICH urgent ACK on the two PHICH resources mapped to the PUCCH resource of the first UE;
   determining a LRB index of the first UE in a specific subframe by receiving the 2-bit PHICH urgent ACK of the first UE;
   determining a total number of LRB indices in the specific subframe by receiving the 2-bit PHICH urgent ACK of the first UEs; and
   determining a PRB index of a resource for transmitting the urgent data based on the LRB index of the first UE and the total number of LRB indices in the specific subframe.

2. The method according to claim 1, wherein each of the two PHICH resources has an index pair form.

3. The method according to claim 2, further comprising allocating, by the base station, a transmission resource of the urgent signal through a radio resource control (RRC) connection establishment procedure.

4. The method according to claim 3, wherein the allocating of the transmission resource of the urgent signal comprises receiving a demodulation reference signal (DMRS) value for the first UE.

5. The method according to claim 4, wherein the two PHICH resources are determined based on the DMRS value, the PRB index of the first slot of the PUCCH resource and the PRB index of the second slot of the PUCCH resource.

6. The method according to claim 5, wherein the PRB index of the first slot and the PRB index of the second slot are in a frequency hopping relationship.

7. The method according to claim 1, wherein the PRB of the resource for transmitting the urgent data is determined by the following equation:

PRB Index of PUSCH=(LRB Index×$N_u$)+Lowest PRB index of PUSCH wherein PUSCH represents a physical uplink shared channel, $N_u$ indicates a resource size occupied by one UE for urgent data resources that can be used in one subframe and LRB Index indicates the LRB index of the first UE in the specific subframe.

8. The method according to claim 7, wherein $N_u$ is determined by the following equation:

$N_u = \lfloor N_{PUSCH\_RB} / N_{SFN\_U\_LRB} \rfloor$ wherein $N_{PUSCH\_RB}$ indicates a total number of resource blocks (RBs) of a UL PUSCH resource and $N_{SFN\_U\_LRB}$ indicates a total number of LRB indices in the specific subframe.

9. The method according to claim 1, wherein the 2-bit response to the urgent signal is ACK or NACK.

10. A method for receiving, by a base station, uplink (UL) data in a wireless communication system supporting a low latency service, the method comprising:
receiving, from an urgent user equipment (UE), an urgent signal (US) for informing occurrence of an event related to an urgent situation on a physical uplink control channel (PUCCH) resource;
determining two physical HARQ (hybrid automatic repeat request) indication channel (PHICH) resources for transmitting a 2-bit response to the urgent signal based on the received urgent signal;
transmitting, to the urgent UE, the 2-bit response to the urgent signal on the determined two PHICH resources; and
receiving, from the urgent UE, urgent data including detailed information related to the occurred event,
wherein each of the two PHICH resources is determined by a physical resource block (PRB) index of a resource on which the urgent signal is transmitted,
wherein one of the two PHICH resources is determined by a PRB index of a first slot of the PUCCH resource and the other one of the two PHICH resources is determined by a PRB index of a second slot of the PUCCH resource, and
wherein a resource position for the urgent data is determined by:
increasing a logical resource block (LRB) index in a subframe related to a received 2-bit PHICH urgent ACK of other first UEs by "1" whenever receiving the 2-bit PHICH urgent ACK of the other first UEs before receiving a 2-bit PHICH urgent ACK on the two PHICH resources mapped to the PUCCH resource of the first UE,
determining a LRB index of the first UE in a specific subframe by receiving the 2-bit PHICH urgent ACK of the first UE,
determining a total number of LRB indices in the specific subframe by receiving the 2-bit PHICH urgent ACK of the first UEs, and
determining a PRB index of a resource for transmitting the urgent data based on the LRB index of the first UE and the total number of LRB indices in the specific subframe.

11. The method according to claim 10, wherein the two PHICH resources are determined based on a demodulation reference signal (DMRS) value, the PRB index of the first slot of the PUCCH resource and the PRB index of the second slot of the PUCCH resource.

12. The method according to claim 11, wherein the DMRS value is allocated per urgent UE.

13. A user equipment (UE) for transmitting uplink (UL) data in a wireless communication system supporting a low latency service, the UE comprising:
a transceiver configured to transmit/receive radio frequency (RF) signals; and
a processor functionally connected to the transceiver, wherein the processor is configured to:
transmit, via the transceiver, an urgent signal (US) for informing occurrence of an event related to an urgent situation to a base station on a physical uplink control channel (PUCCH) resource;
receive, from the base station, a 2-bit response to the urgent signal on two physical HARQ (hybrid automatic repeat request) indication channel (PHICH) resources;
determine a resource position for transmitting urgent data including detailed information related to the occurred event on the basis of the 2-bit response; and
transmit, to the base station, the urgent data on the determined resource position,
wherein each of the two PHICH resources is determined by a physical resource block (PRB) index of a resource on which the urgent signal is transmitted,
wherein one of the two PHICH resources is determined by a PRB index of a first slot of the PUCCH resource and the other one of the two PHICH resources is determined by a PRB index of a second slot of the PUCCH resource, and
wherein the processor is further configured to:
increase a logical resource block (LRB) index in a subframe related to a received 2-bit PHICH urgent ACK of other first UEs by "1" whenever receiving the 2-bit PHICH urgent ACK of the other first UEs before receiving a 2-bit PHICH urgent ACK on the two PHICH resources mapped to the PUCCH resource of the first UE;
determine a LRB index of the first UE in a specific subframe by receiving the 2-bit PHICH urgent ACK of the first UE;
determine a total number of LRB indices in the specific subframe by receiving the 2-bit PHICH urgent ACK of the first UEs; and
determine a PRB index of a resource for transmitting the urgent data based on the LRB index of the first UE and the total number of LRB indices in the specific subframe.

* * * * *